(12) United States Patent
Stolzenberg

(10) Patent No.: US 11,531,402 B1
(45) Date of Patent: Dec. 20, 2022

(54) BIMANUAL GESTURES FOR CONTROLLING VIRTUAL AND GRAPHICAL ELEMENTS

(71) Applicant: Karen Stolzenberg, Venice, CA (US)

(72) Inventor: Karen Stolzenberg, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/589,065

(22) Filed: Jan. 31, 2022

Related U.S. Application Data

(60) Provisional application No. 63/153,781, filed on Feb. 25, 2021.

(51) Int. Cl.
*G06F 3/04847* (2022.01)
*G06F 3/01* (2006.01)
(Continued)

(52) U.S. Cl.
CPC ......... *G06F 3/017* (2013.01); *G02B 27/0101* (2013.01); *G02B 27/017* (2013.01);
(Continued)

(58) Field of Classification Search
CPC . G06F 2203/04101; G06F 2203/04104; G06F 2203/04106; G06F 2203/04808;
(Continued)

(56) References Cited

U.S. PATENT DOCUMENTS 9,024,842 B1    5/2015   Gomez et al.
9,098,739 B2    8/2015   Mutto et al.
(Continued)

FOREIGN PATENT DOCUMENTS

CN    106199511 A    12/2016
EP      3116615 A1    1/2017
(Continued)

OTHER PUBLICATIONS

International Search Report and Written Opinion for International Application No. PCT/US2022/023608, dated Jul. 11, 2022 (Nov. 7, 2022)—12 pages.

(Continued)

*Primary Examiner* — Rayeez R Chowdhury
(74) *Attorney, Agent, or Firm* — Culhane Meadows PLLC; Stephen J. Weed

(57) ABSTRACT

Example systems, devices, media, and methods are described for controlling the presentation of one or more virtual or graphical elements on a display in response to bimanual hand gestures detected by an eyewear device that is capturing frames of video data with its camera system. An image processing system detects a first hand and defines an input plane relative to a surface of the detected first hand. The image processing system also detects a series of bimanual hand shapes, including the detected first hand and at least one fingertip of a second hand. In response, the system presents a first movable element on the display at a location that is correlated with the current fingertip location. In addition, the image processing system determines whether the detected series of bimanual hand shapes matches a predefined hand gesture. In response to a matching gesture, the system executes a selecting action of an element nearest the current fingertip location.

20 Claims, 14 Drawing Sheets

(51) Int. Cl.
*G06V 40/20* (2022.01)
*G06V 40/10* (2022.01)
*G06V 20/40* (2022.01)
*G06F 3/04815* (2022.01)
*G02B 27/01* (2006.01)
*G06T 19/00* (2011.01)

(52) U.S. Cl.
CPC ...... *G06F 3/04815* (2013.01); *G06F 3/04847* (2013.01); *G06T 19/006* (2013.01); *G06V 20/46* (2022.01); *G06V 40/10* (2022.01); *G06V 40/28* (2022.01); *G02B 2027/014* (2013.01); *G02B 2027/0138* (2013.01); *G02B 2027/0178* (2013.01)

(58) Field of Classification Search
CPC ...... G06F 3/0235; G06F 3/041; G06F 3/0412; G06F 3/04166; G06F 3/04186; G06F 3/0446; G06F 3/0447; G06F 3/04815; G06F 3/04845; G06F 3/0485; G06F 3/0488; G06F 3/04883; G06F 3/04886; G06F 3/011; G06F 1/163; G06F 3/017; G06F 3/04842; G06F 3/012; G06F 1/1686; G06F 2203/04806; G06F 3/0304; G06F 3/0425; G06F 3/0481; G06F 3/04817; G06F 3/0484; G06F 3/04847; G06F 3/04855; G06F 30/10
See application file for complete search history.

(56) References Cited

U.S. PATENT DOCUMENTS

| | | | |
|---|---|---|---|
| 9,235,051 | B2 | 1/2016 | Salter et al. |
| 9,459,454 | B1 | 10/2016 | The et al. |
| 9,541,996 | B1 | 1/2017 | Baxter et al. |
| 9,552,673 | B2 | 1/2017 | Hilliges et al. |
| 9,990,029 | B2 | 6/2018 | Kochi |
| 9,996,983 | B2 | 6/2018 | Mullins |
| 10,057,400 | B1 | 8/2018 | Gordon et al. |
| 10,146,414 | B2 | 12/2018 | Heater |
| 10,220,303 | B1 | 3/2019 | Schmidt et al. |
| 10,372,228 | B2 | 8/2019 | Mao et al. |
| 10,394,334 | B2 | 8/2019 | Wang |
| 10,509,461 | B2 | 12/2019 | Mullen |
| 10,579,207 | B2 | 3/2020 | Piya et al. |
| 10,782,779 | B1 | 9/2020 | Eubank et al. |
| 10,853,991 | B1 | 12/2020 | Yan et al. |
| 11,086,126 | B1 | 8/2021 | Gollier et al. |
| 17,588,934 | | 1/2022 | Stolzenberg |
| 11,275,453 | B1 | 3/2022 | Tham et al. |
| 11,277,597 | B1 | 3/2022 | Canberk et al. |
| 17,719,654 | | 4/2022 | Hwang |
| 2010/0085317 | A1 | 4/2010 | Park et al. |
| 2011/0213664 | A1* | 9/2011 | Osterhout ............... G06F 3/013 705/14.58 |
| 2012/0113223 | A1 | 5/2012 | Hilliges et al. |
| 2012/0327117 | A1 | 12/2012 | Weller et al. |
| 2013/0328927 | A1 | 12/2013 | Mount et al. |
| 2014/0043211 | A1 | 2/2014 | Park |
| 2014/0225918 | A1 | 8/2014 | Mittal et al. |
| 2014/0347289 | A1 | 11/2014 | Suh et al. |
| 2014/0361988 | A1 | 12/2014 | Katz et al. |
| 2014/0368533 | A1 | 12/2014 | Salter et al. |
| 2015/0049017 | A1 | 2/2015 | Weber et al. |
| 2015/0097719 | A1 | 4/2015 | Balachandreswaran et al. |
| 2015/0109197 | A1 | 4/2015 | Takagi |
| 2015/0317833 | A1 | 11/2015 | Ebstyne et al. |
| 2015/0331576 | A1 | 11/2015 | Piya et al. |
| 2015/0370321 | A1 | 12/2015 | Lundberg |
| 2016/0033770 | A1 | 2/2016 | Fujimaki et al. |
| 2016/0035134 | A1 | 2/2016 | Tanaka et al. |
| 2016/0260251 | A1 | 9/2016 | Stafford et al. |
| 2016/0261834 | A1* | 9/2016 | Li ...................... H04N 9/3173 |
| 2016/0306431 | A1 | 10/2016 | Stafford et al. |
| 2017/0014683 | A1 | 1/2017 | Maruyama et al. |
| 2017/0028299 | A1 | 2/2017 | The et al. |
| 2017/0053447 | A1 | 2/2017 | Chen et al. |
| 2017/0124713 | A1 | 5/2017 | Jurgenson et al. |
| 2017/0140552 | A1 | 5/2017 | Woo et al. |
| 2017/0270711 | A1 | 9/2017 | Schoenberg |
| 2017/0293364 | A1 | 10/2017 | Wang |
| 2017/0295446 | A1 | 10/2017 | Shivappa |
| 2017/0352184 | A1 | 12/2017 | Poulos et al. |
| 2017/0357334 | A1 | 12/2017 | Balan et al. |
| 2018/0005443 | A1 | 1/2018 | Poulos et al. |
| 2018/0024641 | A1 | 1/2018 | Mao et al. |
| 2018/0039852 | A1 | 2/2018 | Nakamura et al. |
| 2018/0075659 | A1 | 3/2018 | Browy et al. |
| 2018/0196503 | A1 | 7/2018 | Ikeda et al. |
| 2018/0259775 | A1 | 9/2018 | Ono et al. |
| 2018/0329209 | A1 | 11/2018 | Nattukallingal |
| 2019/0025595 | A1 | 1/2019 | Fukuda et al. |
| 2019/0102927 | A1 | 4/2019 | Yokokawa |
| 2019/0122085 | A1 | 4/2019 | Tout et al. |
| 2019/0220098 | A1 | 7/2019 | Gupta |
| 2019/0299059 | A1 | 10/2019 | Case, Jr. et al. |
| 2019/0318544 | A1 | 10/2019 | Skidmore et al. |
| 2019/0324553 | A1 | 10/2019 | Liu et al. |
| 2019/0325651 | A1 | 10/2019 | Bradner et al. |
| 2019/0361521 | A1 | 11/2019 | Stellmach et al. |
| 2019/0377416 | A1 | 12/2019 | Alexander |
| 2020/0005026 | A1 | 1/2020 | Andersen et al. |
| 2020/0064924 | A1 | 2/2020 | Poupyrev et al. |
| 2020/0097065 | A1 | 3/2020 | Iyer et al. |
| 2020/0218423 | A1 | 7/2020 | Ohashi |
| 2020/0311396 | A1 | 10/2020 | Pollefeys et al. |
| 2020/0312029 | A1 | 10/2020 | Heinen et al. |
| 2021/0019036 | A1 | 1/2021 | Wang et al. |
| 2021/0041702 | A1 | 2/2021 | Kimura et al. |
| 2021/0090337 | A1 | 3/2021 | Ravasz et al. |
| 2021/0096726 | A1 | 4/2021 | Faulkner et al. |
| 2021/0208698 | A1 | 7/2021 | Martin et al. |
| 2021/0209153 | A1 | 7/2021 | Zhang |
| 2021/0275914 | A1 | 9/2021 | Wu et al. |
| 2021/0373650 | A1 | 12/2021 | Kang et al. |
| 2022/0088476 | A1 | 3/2022 | Canberk et al. |
| 2022/0103748 | A1 | 3/2022 | Canberk |
| 2022/0326781 | A1 | 4/2022 | Hwang |
| 2022/0206588 | A1 | 6/2022 | Canberk et al. |

FOREIGN PATENT DOCUMENTS

| | | |
|---|---|---|
| EP | 3699736 A1 | 8/2020 |
| WO | 2015192117 A1 | 12/2015 |

OTHER PUBLICATIONS

International Search Report and Written Opinion for International Application No. PCT/US2022/024565, dated Jul. 25, 2022 (Jul. 25, 2022)—15 pages.
U.S. Appl. No. 17/714,352, filed Apr. 6, 2022 to Hwang et al.
U.S. Appl. No. 17/719,654, filed Apr. 13, 2022 to Hwang et al.
Cas and Chary VR: https://www.youtube.com/watch?_8VqQfrHG94, viewed on Dec. 4, 2021, published online on Feb. 25, 2020 (Year: 2020).
Chatain, Julia et al., "DigiGlo: Exploring the Palm as an Input and Display Mechanism through Digital Gloves," Association for Computing Machinery, Chi Play '20, Nov. 2-4, 2020, Virtual Event, Canada, 12 pages.
Cirulis Arnis: "Large Scale Augmented Reality for Collaborative Environments", Jul. 10, 2020 (Jul. 10, 2020), Computer Vision—ECCV 2020: 16th European Conference, Glasgow, UK, Aug. 23-28, 2020 Proceedings; [Lecture Notes in Computer Science; ISSN 0302-9743], Springer International Publishing, Cham, pp. 325-335, XP047554326, ISBN: 978-3-030-58594-5.
Engadget: "Google Glass Gesture Recognition by OnTheGo Platforms at CES 2014 : Engadget", Jan. 8, 2014 (Jan. 8, 2014), XP055859805, Retrieved from the Internet: URL:https://www.youtube.com/watch?v=d_jI_ZxPECg [retrieved on Nov. 11, 2021] 00:39s, 00:55s, 01:00-01:10s.

(56) References Cited

OTHER PUBLICATIONS

International Search Report and Written Opinion for International Application No. PCT/US2021/033642, dated Aug. 30, 2021 (Aug. 30, 2021)—11 pages.
International Search Report and Written Opinion for International Application No. PCT/US2021/051109, dated Dec. 10, 2021 (Oct. 12, 2021)—17 pages.
International Search Report and Written Opinion for International Application No. PCT/US2021/063295, dated Mar. 17, 2022 (Mar. 17, 2022)—13 pages.
Matthias Schwaller et al: "Pointing in the Air: Measuring the Effect of Hand Selection Strategies on Performance and Effort", Jul. 1, 2013 (Jul. 1, 2013), Human Factors in Computing and Informatics, Springer Berlin Heidelberg, Berlin, Heidelberg, pp. 732-747, XP047033542, ISBN 978-3-642-39061-6, p. 740; figure 4.
Partial International Search Report and Written Opinion for International Application No. PCT/US2021/047637, dated Jan. 7, 2022 (Jul. 1, 2022)—10 pages.

* cited by examiner

BIMANUAL GESTURES FOR CONTROLLING VIRTUAL AND GRAPHICAL ELEMENTS

CROSS-REFERENCE TO RELATED APPLICATIONS

This application claims priority to U.S. Provisional Application No. 63/153,781 filed on Feb. 25, 2021, the contents of which are incorporated fully herein by reference.

TECHNICAL FIELD

Examples set forth in the present disclosure relate to the field of display control for electronic devices, including wearable devices such as eyewear. More particularly, but not by way of limitation, the present disclosure describes the real-time tracking of two-handed gestures for interacting with virtual elements on a display.

BACKGROUND

Many types of computers and electronic devices available today, such as mobile devices (e.g., smartphones, tablets, and laptops), handheld devices, and wearable devices (e.g., smart glasses, digital eyewear, headwear, headgear, and head-mounted displays), include a variety of cameras, sensors, wireless transceivers, input systems, and displays.

Graphical user interfaces allow the user to interact with displayed content, including virtual objects and graphical elements such as icons, taskbars, list boxes, menus, buttons, and selection control elements like cursors, pointers, handles, and sliders.

Virtual reality (VR) technology generates a complete virtual environment including realistic images, sometimes presented on a VR headset or other head-mounted display. VR experiences allow a user to move through the virtual environment and interact with virtual objects. Augmented reality (AR) is a type of VR technology that combines real objects in a physical environment with virtual objects and displays the combination to a user. The combined display gives the impression that the virtual objects are authentically present in the environment, especially when the virtual objects appear and behave like the real objects. Cross reality (XR) is generally understood as an umbrella term referring to systems that include or combine elements from AR, VR, and MR (mixed reality) environments.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
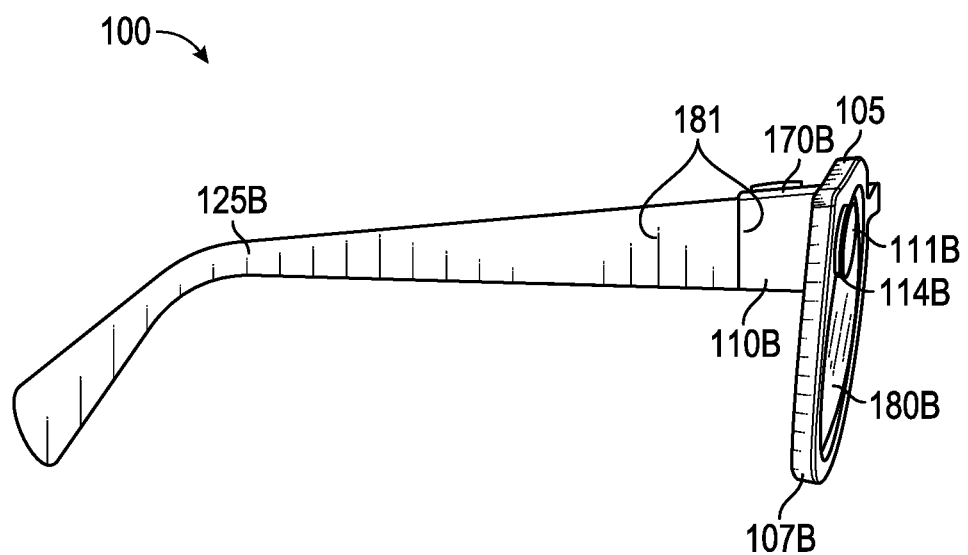
FIG. 1A is a side view (right) of an example hardware configuration of an eyewear device suitable for use in an example bimanual control system.

Various implementations and details are described with reference to examples for navigating and interacting with virtual content in AR, VR, XR, or a combination thereof using bimanual hand gestures. For example, a dominant hand may interact with a non-dominant hand as a physical surface to give indirect virtual system input. In accordance with this example, the non-dominant hand may become a virtual trackpad that can receive gesture events from the dominant hand where the non-dominant hand provides haptic feedback, stability and comfort over gestures performed mid-air by the dominant hand without physical contact.

Examples include a method of controlling a graphical element in response to bimanual gestures detected with an eyewear device. The eyewear device includes a camera system, an image processing system, a localization system, and a display. The method includes presenting on the display one or more graphical elements at a first position relative to a display plane, capturing frames of video data with the camera system, and detecting a first hand in the captured frames of video data with the image processing system. The method also includes defining, with the image processing system, a first input plane associated with a surface of the detected first hand, wherein the first input plane is defined relative to the display plane. To correlate the first input plane on the hand with the display plane on the eyewear, the method includes determining, with the localization system, a current eyewear location relative to the defined first input plane and calculating a correlation between the defined first input plane and the display plane, in accordance with the current eyewear location.

In addition, the method includes detecting, with the image processing system, a series of bimanual hand shapes comprising a series of current fingertip locations associated with a fingertip of a second hand, relative to the defined first input plane. In response, the method includes presenting on the display a first movable element at a current first element position, in accordance with both a current fingertip location and the calculated correlation. The method further includes determining, with the image processing system, whether the detected series of bimanual hand shapes matches a predefined hand gesture selected from a plurality of predefined hand gestures. In response to a match, the method includes executing a selecting action in accordance with both the matching predefined hand gesture and the current first element position.

Although the various systems and methods are described herein with reference to capturing sill images with an eyewear device, the technology described may be applied to selecting and capturing still images from a sequence of frames of video data that were captured by other devices.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices, associated components and any other devices incorporating a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Advanced AR technologies, such as computer vision and object tracking, may be used to produce a perceptually enriched and immersive experience. Computer vision algorithms extract three-dimensional data about the physical world from the data captured in digital images or video. Object recognition and tracking algorithms are used to detect an object in a digital image or video, estimate its orientation or pose, and track its movement over time. Hand and finger recognition and tracking in real time is one of the most challenging and processing-intensive tasks in the field of computer vision.

The term "pose" refers to the static position and orientation of an object at a particular instant in time. The term "gesture" refers to the active movement of an object, such as a hand, through a series of poses, sometimes to convey a signal or idea. The terms, pose and gesture, are sometimes used interchangeably in the field of computer vision and augmented reality. As used herein, the terms "pose" or "gesture" (or variations thereof) are intended to be inclusive of both poses and gestures; in other words, the use of one term does not exclude the other.

The term "bimanual gesture" means and describes a gesture performed with both hands. One hand may be relatively stationary, while the other hand is moving. In some bimanual gestures, both hands appear relatively stationary; the gesture occurs in small movements between the fingers and surfaces of the two hands. Although the two hands may operate in relative opposition to perform a bimanual gesture, the term includes gestures made by both hands operating together, in tandem.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear device 100 may include a touchpad on the left side.

The surface of the touchpad 181 is configured to detect finger touches, taps, and gestures (e.g., moving touches) for use with a GUI displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear device 100 includes a right visible-light camera 114B. As further described herein, two cameras 114A, 114B capture image information for a scene from two separate viewpoints. The two captured images may be used to project a three-dimensional display onto an image display for viewing with 3D glasses.

Figure 1B:
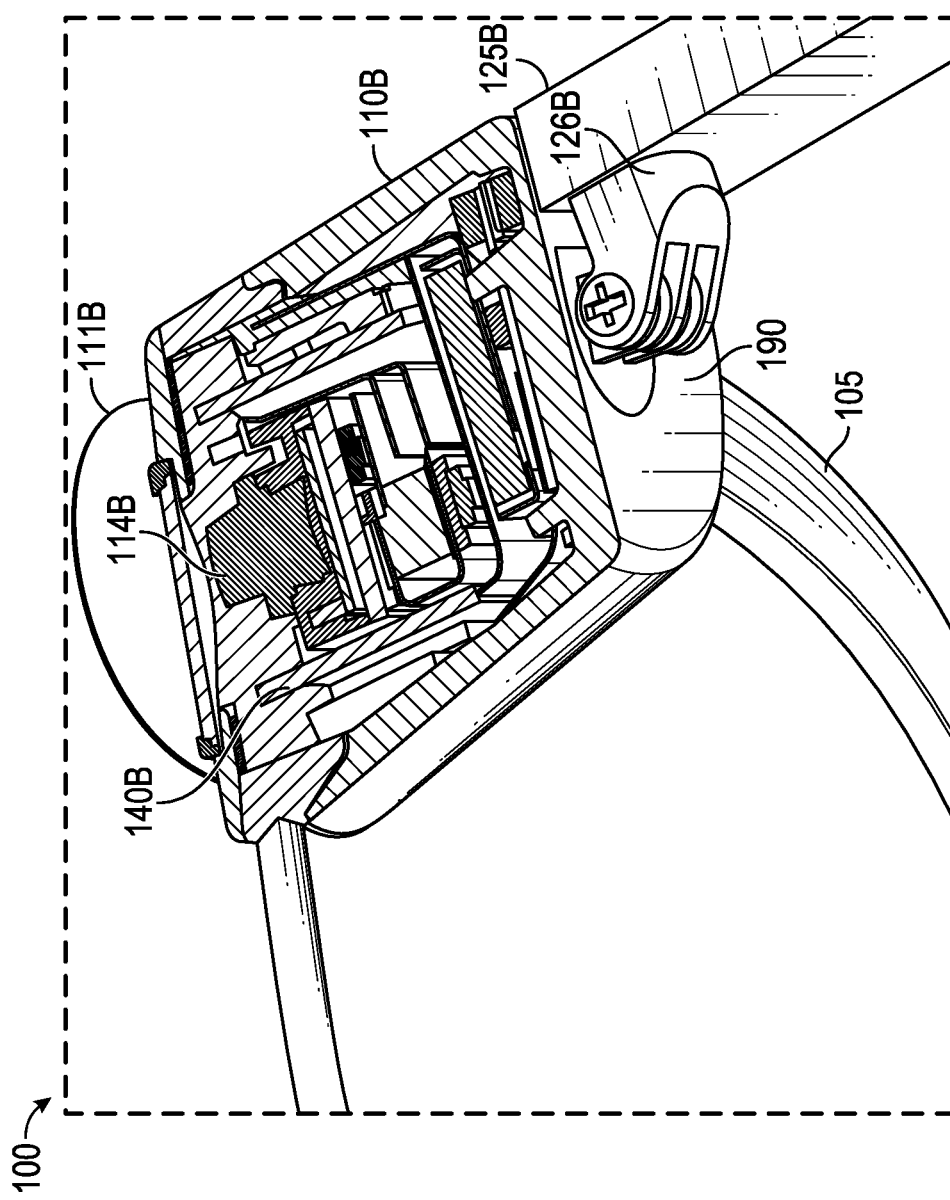
FIG. 1B is a perspective, partly sectional view of a right corner of the eyewear device of FIG. 1A depicting a right visible-light camera, and a circuit board.
Figure 1C:
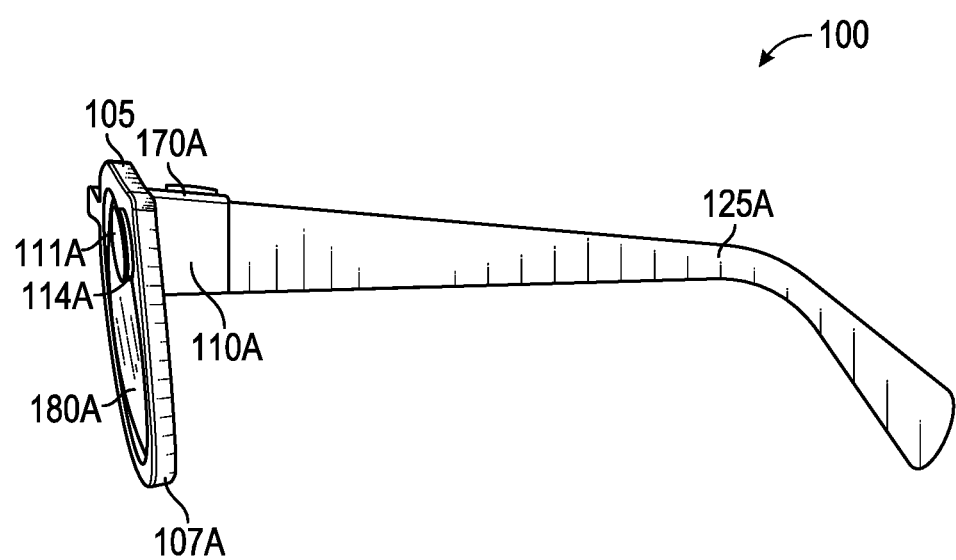
FIG. 1C is a side view (left) of an example hardware configuration of the eyewear device of FIG. 1A, which shows a left visible-light camera.
Figure 1D:
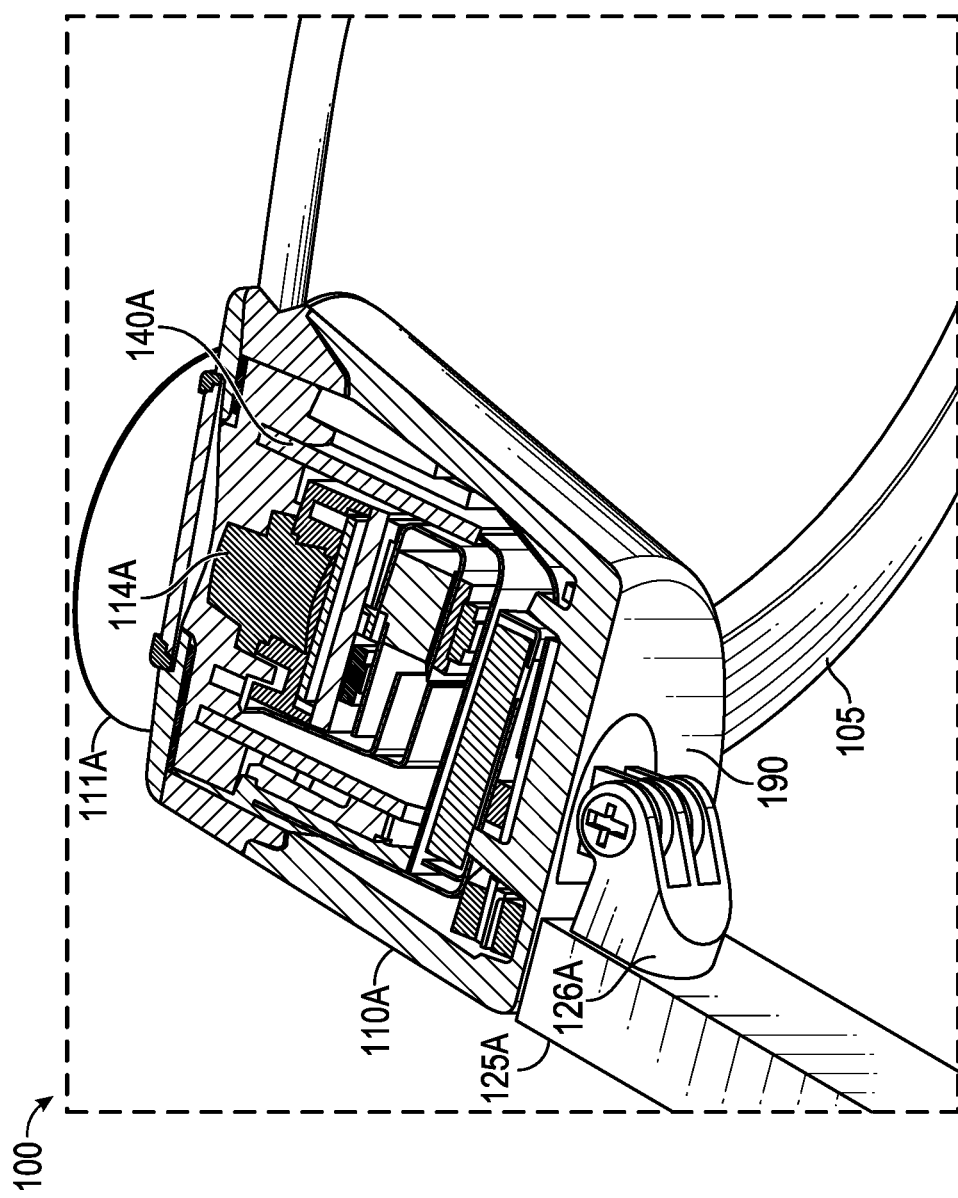
FIG. 1D is a perspective, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Figure 3:
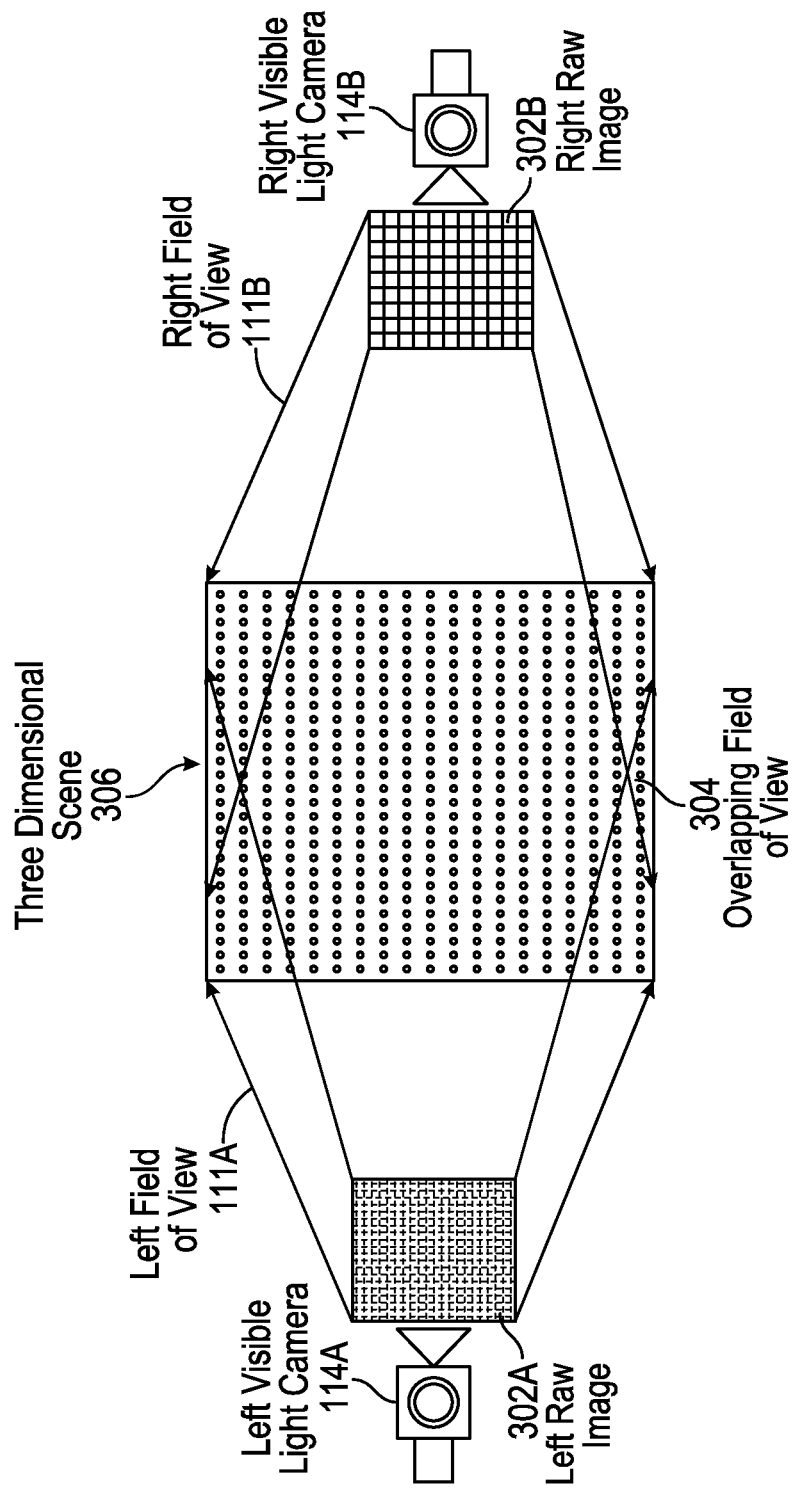
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example configuration, one or both visible-light cameras 114A, 114B has a field of view of 100° and a resolution of 480×480 pixels. The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 480p (e.g., 640×480 pixels), 720p, 1080p, or greater. Other examples include visible-light cameras 114A, 114B that can capture high-definition (HD) video at a high frame rate (e.g., thirty to sixty frames per second, or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412, or another processor, controls operation of the visible-light cameras 114A, 114B to act as a stereo camera simulating human binocular vision and may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 1B is a perspective, cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a perspective, cross-sectional view of a left corner 110A of the eyewear device of FIG. 1C depicting the left visible-light camera 114A of the three-dimensional camera, and a circuit board.

Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). A right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B. A left hinge 126B connects the left corner 110A to a left temple 125A of the eyewear device 100. In some examples, components of the left visible-light camera 114A, the flexible PCB 140A, or other electrical connectors or contacts may be located on the left temple 125A or the left hinge 126A.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via Wi-Fi).

Figure 2A:
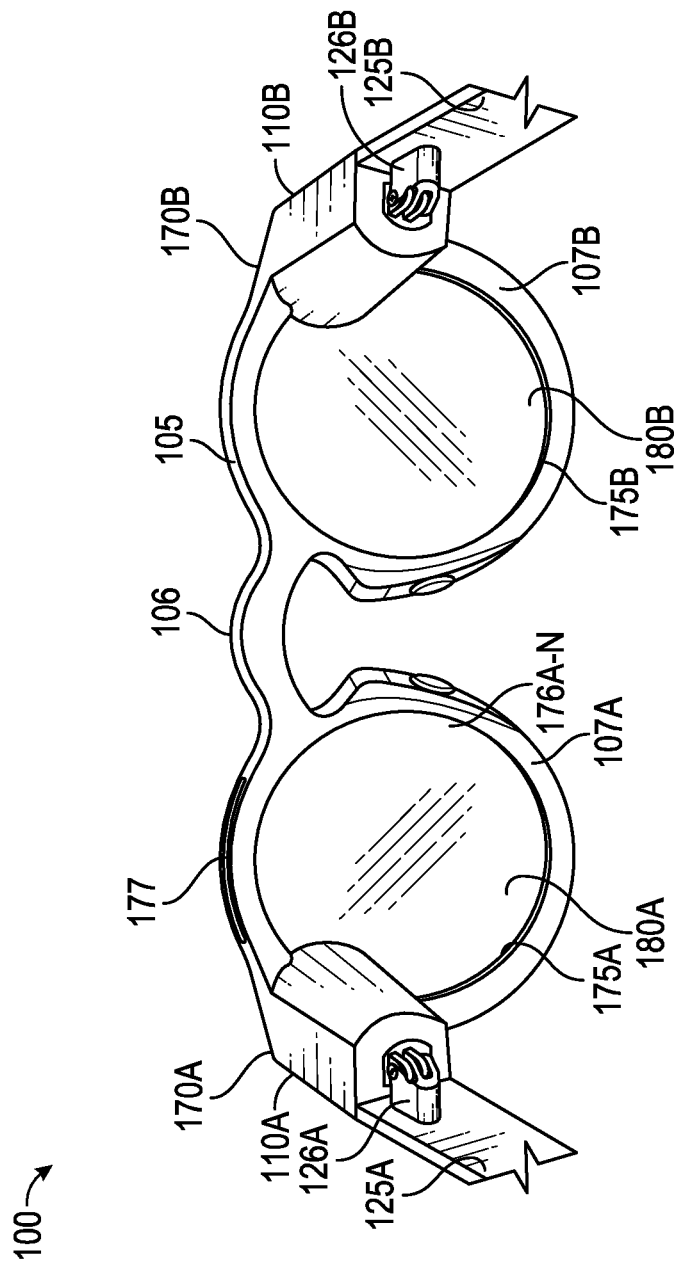
FIGS. 2A and 2B are rear views of example hardware configurations of an eyewear device utilized in an example bimanual control system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
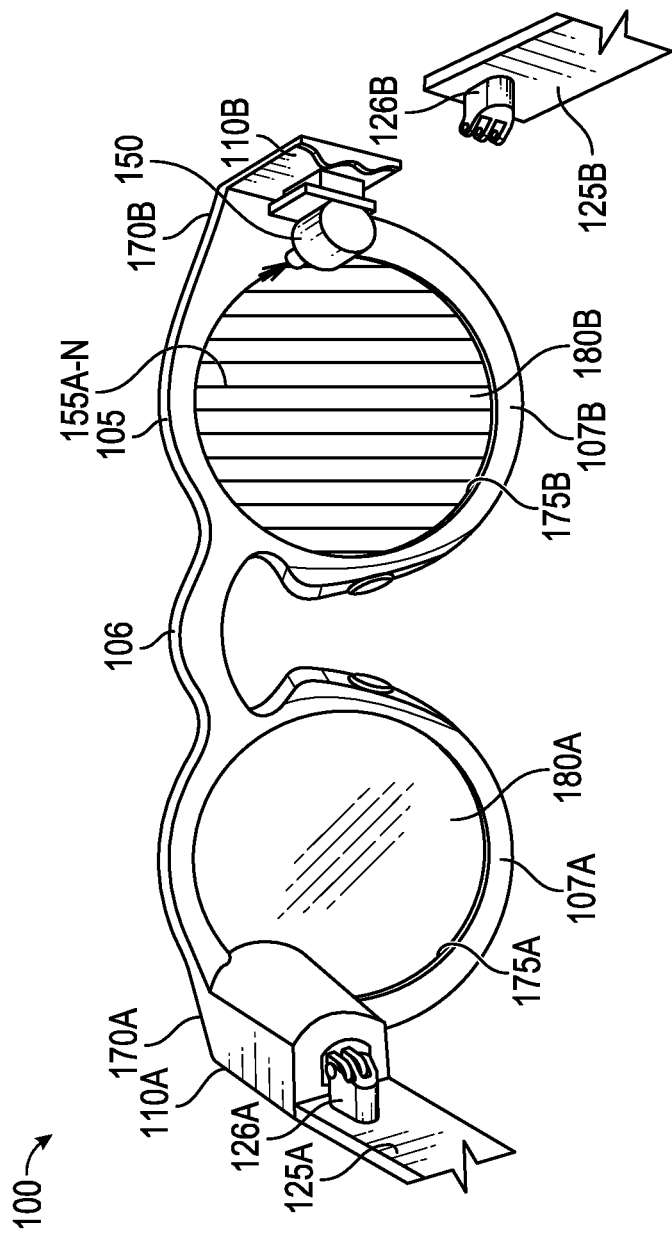

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge or diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector 150A (not shown) and a right projector 150B (shown as projector 150). The left optical assembly 180A may include a left display matrix 177A (not shown) or a left set of optical strips 155'A, 155'B, . . . 155'N (155 prime, A through N, not shown) which are configured to interact with light from the left projector 150A. Similarly, the right optical assembly 180B may include a right display matrix 177B (not shown) or a right set of optical strips 155"A, 155"B, . . . 155"N (155 double prime, A through N, not shown) which are configured to interact with light from the right projector 150B. In this example, the eyewear device 100 includes a left display and a right display.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a timestamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the bimanual control system 400 (FIG. 4) includes the eyewear device 100, which includes a frame 105 and a left temple 125A extending from a left lateral side 170A of the frame 105 and a right temple 125B extending from a right lateral side 170B of the frame 105. The eyewear device 100 may further include at least two visible-light cameras 114A, 114B having overlapping fields of view. In one example, the eyewear device 100 includes a left visible-light camera 114A with a left field of view 111A, as illustrated in FIG. 3. The left camera 114A is connected to the frame 105 or the left temple 125A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

Figure 4:
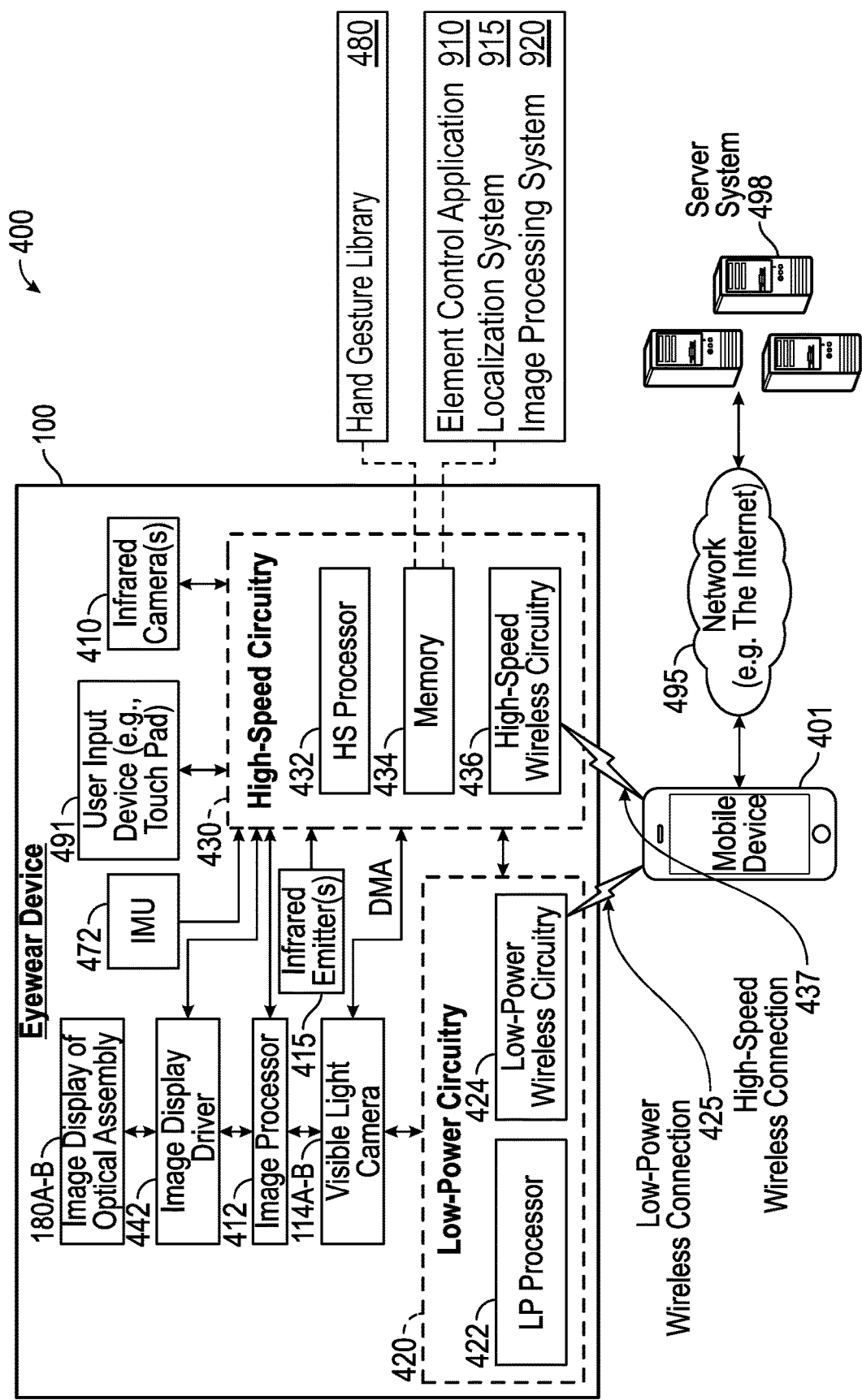
FIG. 4 is a functional block diagram of an example bimanual control system including a wearable device (e.g., an eyewear device) and a server system connected via various networks.

FIG. 4 is a functional block diagram of an example bimanual control system 400 that includes a wearable device (e.g., an eyewear device 100), a mobile device 401, and a server system 498 connected via various networks 495 such as the Internet. As shown, the bimanual control system 400 includes a low-power wireless connection 425 and a high-speed wireless connection 437 between the eyewear device 100 and the mobile device 401.

As shown in FIG. 4, the eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include a depth sensor 213, which uses infrared signals to estimate the position of objects relative to the device 100. The depth sensor 213 in some examples includes one or more infrared emitter(s) 215 and infrared camera(s) 410.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images, video images, or still and video images. The image display driver 442 is coupled to the image displays of each optical assembly 180A, 180B in order to control the display of images.

The eyewear device 100 additionally includes one or more speakers 440 (e.g., one associated with the left side of the eyewear device and another associated with the right side of the eyewear device). The speakers 440 may be incorporated into the frame 105, temples 125, or corners 110 of the eyewear device 100. The one or more speakers 440 are driven by audio processor 443 under control of low-power circuitry 420, high-speed circuitry 430, or both. The speakers 440 are for presenting audio signals including, for example, a beat track. The audio processor 443 is coupled to the speakers 440 in order to control the presentation of sound.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Figure 5:
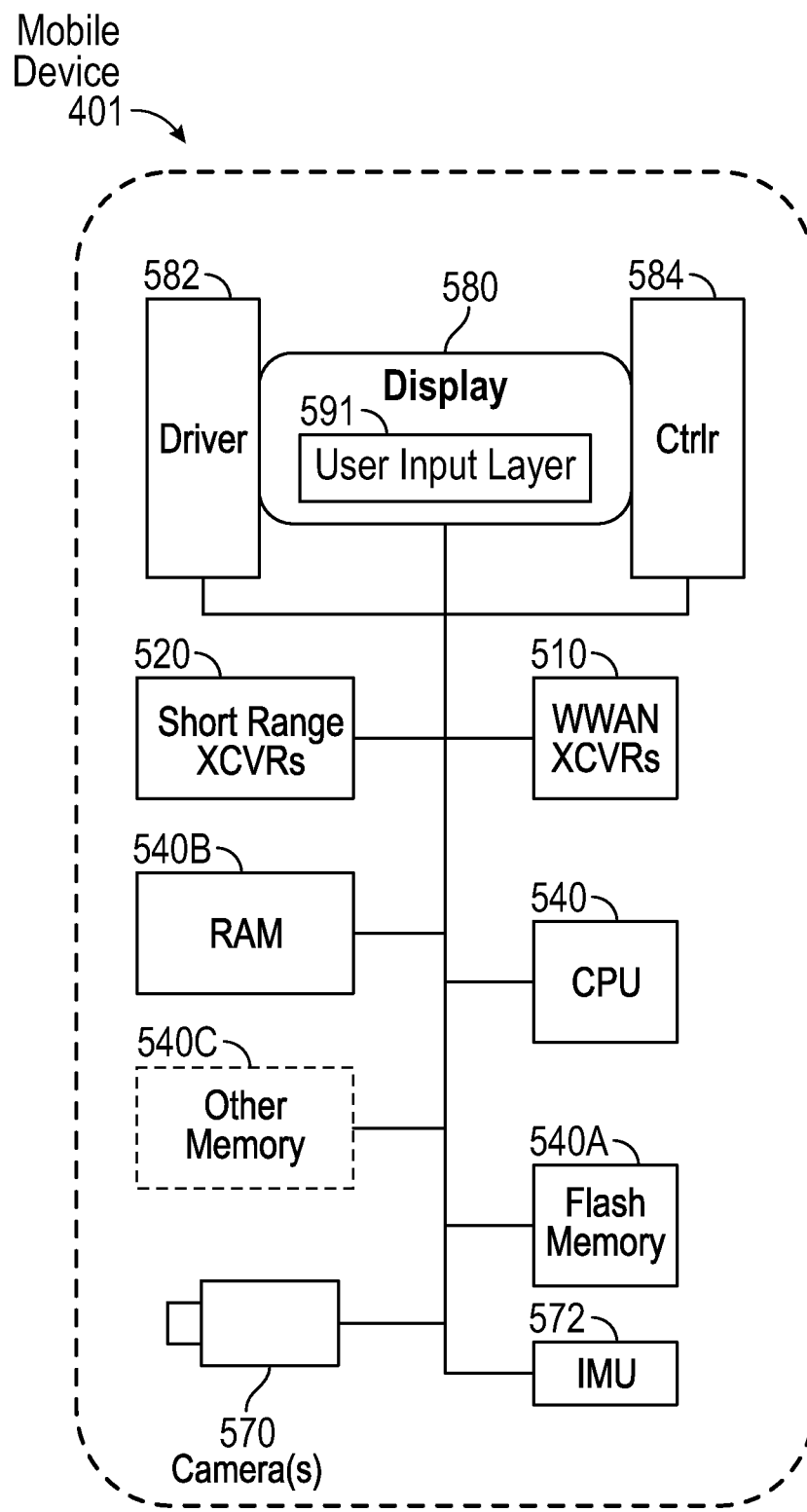
FIG. 5 is a diagrammatic representation of an example hardware configuration for a mobile device suitable for use in the example bimanual control system of FIG. 4.

As shown in FIG. 4, the high-speed processor 432 of the eyewear device 100 can be coupled to the camera system (visible-light cameras 114A, 114B), the image display driver 442, the user input device 491, and the memory 434. As shown in FIG. 5, the CPU 530 of the mobile device 401 may be coupled to a camera system 570, a mobile display driver 582, a user input layer 591, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), and audio input components (e.g., a microphone), and the like. The mobile device 401 and the server system 498 may include alphanumeric, pointer-based, tactile, audio, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit 473, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The bimanual control system 400, as shown in FIG. 4, includes a computing device, such as mobile device 401, coupled to an eyewear device 100 over a network. The bimanual control system 400 includes a memory for storing instructions and a processor for executing the instructions. Execution of the instructions of the bimanual control system 400 by the processor 432 configures the eyewear device 100 to cooperate with the mobile device 401. The bimanual control system 400 may utilize the memory 434 of the eyewear device 100 or the memory elements 540A, 540B, 540C of the mobile device 401 (FIG. 5). Also, the bimanual control system 400 may utilize the processor elements 432, 422 of the eyewear device 100 or the central processing unit (CPU) 530 of the mobile device 401 (FIG. 5). In addition, the bimanual control system 400 may further utilize the memory and processor elements of the server system 498. In this aspect, the memory and processing functions of the bimanual control system 400 can be shared or distributed across the processors and memories of the eyewear device 100, the mobile device 401, and the server system 498.

The memory 434, in some example implementations, includes or is coupled to a hand gesture library 480, as described herein. The process of detecting a hand shape, in some implementations, involves comparing the pixel-level data in one or more captured frames of video data 900 to the hand gestures stored in the library 480 until a good match is found.

The memory 434 additionally includes, in some example implementations, an element control application 910, a localization system 915, and an image processing system 920. In a bimanual control system 400 in which a camera is capturing frames of video data 900, the element control application 910 configures the processor 432 to control the movement of a series of virtual items 700 on a display in response to detecting one or more hand shapes or gestures. The localization system 915 configures the processor 432 to obtain localization data for use in determining the position of the eyewear device 100 relative to the physical environment. The localization data may be derived from a series of images, an IMU unit 472, a GPS unit 473, or a combination thereof. The image processing system 920 configures the processor 432 to present a captured still image on a display of an optical assembly 180A, 180B in cooperation with the image display driver 442 and the image processor 412.

FIG. 5 is a high-level functional block diagram of an example mobile device 401. Mobile device 401 includes a flash memory 540A which stores programming to be executed by the CPU 530 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a display controller 584. In the example of FIG. 5, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 891 for receiving input (by touch, multi-touch, or gesture, and the like, by hand, stylus, or other tool) and an image display 580 for displaying content As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The client device 401 in some examples includes a collection of motion-sensing components referred to as an inertial measurement unit (IMU) 572 for sensing the position, orientation, and motion of the client device 401. The motion-sensing components may be micro-electro-mechanical systems (MEMS) with microscopic moving parts, often small enough to be part of a microchip. The inertial measurement unit (IMU) 572 in some example configurations includes an accelerometer, a gyroscope, and a magnetometer. The accelerometer senses the linear acceleration of the client device 401 (including the acceleration due to gravity) relative to three orthogonal axes (x, y, z). The gyroscope senses the angular velocity of the client device 401 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the client device 401 relative to magnetic north.

The IMU 572 may include or cooperate with a digital motion processor or programming that gathers the raw data from the components and compute a number of useful values about the position, orientation, and motion of the client device 401. For example, the acceleration data gathered from the accelerometer can be integrated to obtain the velocity relative to each axis (x, y, z); and integrated again to obtain the position of the client device 401 (in linear coordinates, x, y, and z). The angular velocity data from the gyroscope can be integrated to obtain the position of the client device 401 (in spherical coordinates). The programming for computing these useful values may be stored in on or more memory elements 540A, 540B, 540C and executed by the CPU 540 of the client device 401.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 530 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 530 or processor hardware in smartphone, laptop computer, and tablet.

The CPU 530 serves as a programmable host controller for the mobile device 401 by configuring the mobile device 401 to perform various operations, for example, in accordance with instructions or programming executable by CPU 530. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 530, e.g., as a working data processing memory. The flash memory 540A typically provides longer-term storage.

Hence, in the example of mobile device 401, the flash memory 540A is used to store programming or instructions for execution by the CPU 530. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device within the mapped environment, and determine a relative position of the eyewear device to one or more objects in the mapped environment. The processor 432 may construct the map and determine location and position information using a simultaneous localization and mapping (SLAM) algorithm applied to data received from one or more sensors. Sensor data includes images received from one or both of the cameras 114A, 114B, distance(s) received from a laser range finder, position information received from a GPS unit 473, motion and acceleration data received from an IMU 572, or a combination of data from such sensors, or from other sensors that provide data useful in determining positional information. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection. In a system that includes a high-definition (HD) video camera that captures video at a high frame rate (e.g., thirty frames per second), the SLAM algorithm updates the map and the location of objects at least as frequently as the frame rate; in other words, calculating and updating the mapping and localization thirty times per second.

Sensor data includes image(s) received from one or both cameras 114A, 114B, distance(s) received from a laser range finder, position information received from a GPS unit 473, motion and acceleration data received from an IMU 472, or a combination of data from such sensors, or from other sensors that provide data useful in determining positional information.

Figure 6:
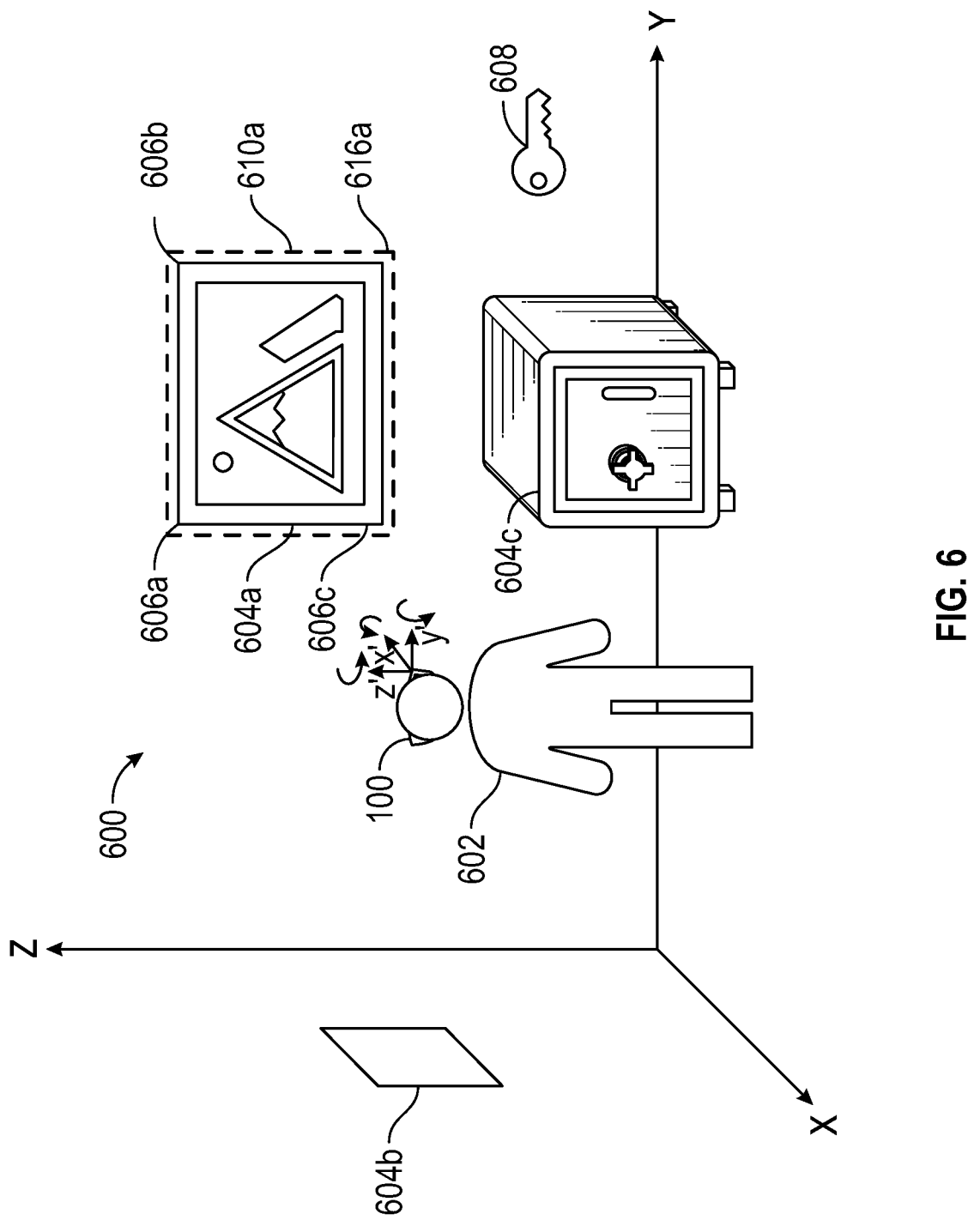
FIG. 6 is a schematic illustration of a user in an example environment for use in describing simultaneous localization and mapping.

FIG. 6 depicts an example physical environment 600 along with elements that are useful when using a SLAM application and other types of tracking applications (e.g., natural feature tracking (NFT)). A user 602 of eyewear device 100 is present in an example physical environment 600 (which, in FIG. 6, is an interior room). The processor 432 of the eyewear device 100 determines its position with respect to one or more objects 604 within the environment 600 using captured images, constructs a map of the environment 600 using a coordinate system (x, y, z) for the environment 600, and determines its position within the coordinate system. Additionally, the processor 432 determines a head pose (roll, pitch, and yaw) of the eyewear device 100 within the environment by using two or more location points (e.g., three location points 606a, 606b, and 606c) associated with a single object 604a, or by using one or more location points 606 associated with two or more objects 604a, 604b, 604c. The processor 432 of the eyewear device 100 may position a virtual object 608 (such as the key shown in FIG. 6) within the environment 600 for viewing during an augmented reality experience.

The localization system 915 in some examples a virtual marker 610a associated with a virtual object 608 in the environment 600. In augmented reality, markers are registered at locations in the environment to assist devices with the task of tracking and updating the location of users, devices, and objects (virtual and physical) in a mapped environment. Markers are sometimes registered to a high-contrast physical object, such as the relatively dark object, such as the framed picture 604a, mounted on a lighter-colored wall, to assist cameras and other sensors with the task of detecting the marker. The markers may be preassigned or may be assigned by the eyewear device 100 upon entering the environment.

Markers can be encoded with or otherwise linked to information. A marker might include position information, a physical code (such as a bar code or a QR code; either visible to the user or hidden), or a combination thereof. A set of data associated with the marker is stored in the memory 434 of the eyewear device 100. The set of data includes information about the marker 610a, the marker's position (location and orientation), one or more virtual objects, or a combination thereof. The marker position may include three-dimensional coordinates for one or more marker landmarks 616a, such as the corner of the generally rectangular marker 610a shown in FIG. 6. The marker location may be expressed relative to real-world geographic coordinates, a system of marker coordinates, a position of the eyewear device 100, or other coordinate system. The one or more virtual objects associated with the marker 610a may include any of a variety of material, including still images, video, audio, tactile feedback, executable applications, interactive user interfaces and experiences, and combinations or sequences of such material. Any type of content capable of being stored in a memory and retrieved when the marker 610a is encountered or associated with an assigned marker may be classified as a virtual object in this context. The key 608 shown in FIG. 6, for example, is a virtual object displayed as a still image, either 2D or 3D, at a marker location.

In one example, the marker 610a may be registered in memory as being located near and associated with a physical object 604a (e.g., the framed work of art shown in FIG. 6). In another example, the marker may be registered in memory as being a particular position with respect to the eyewear device 100.

Figure 10:
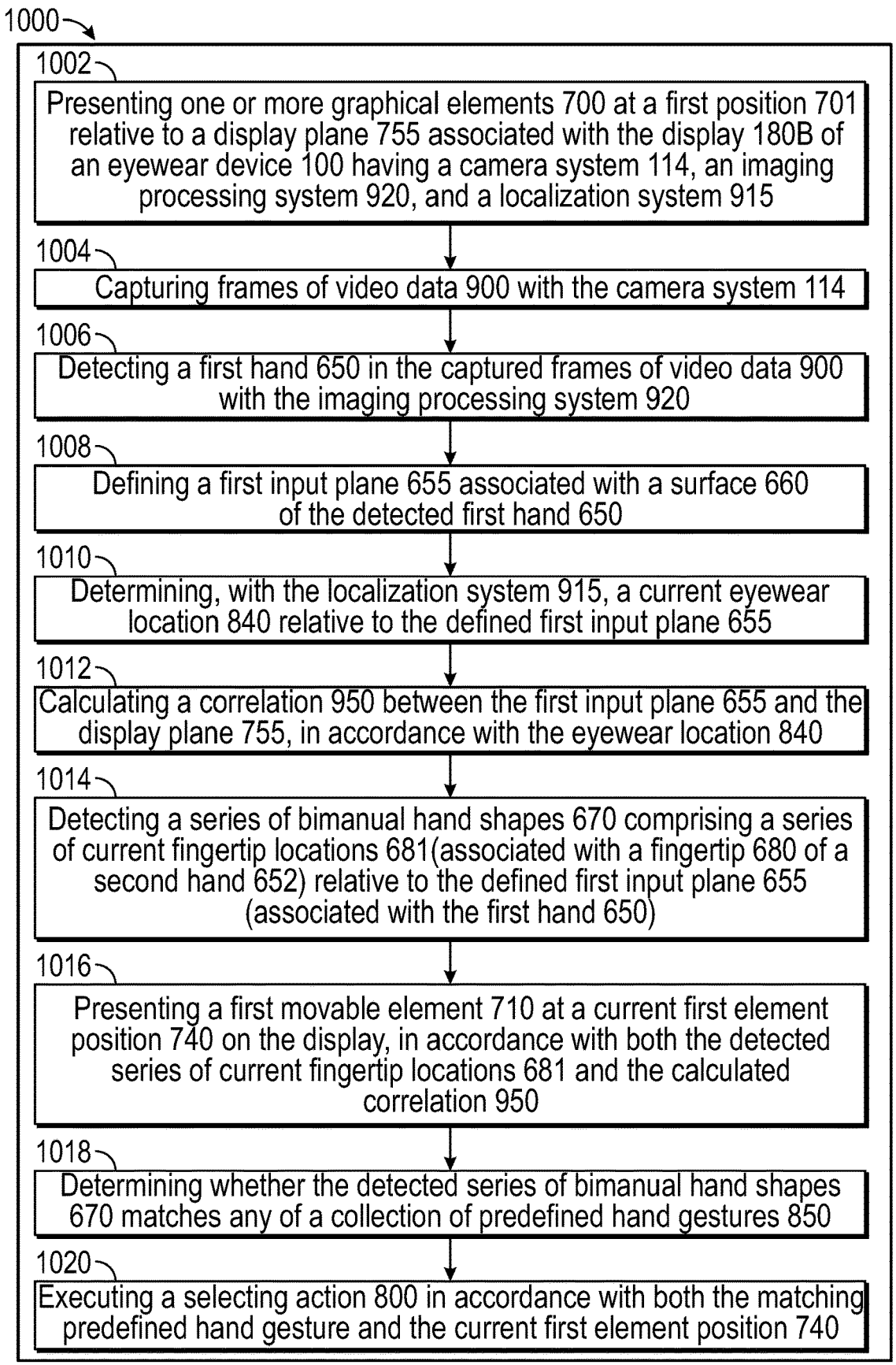
FIG. 10 is a flow chart listing the steps in an example method of controlling the presentation on a display of virtual elements or graphical elements in response to detected bimanual hand gestures.

FIG. 10 is a flow chart 1000 depicting an example method of controlling a virtual element or graphical element on the display 180 of an eyewear device 100. Although the steps are described with reference to the eyewear device 100 described herein, other implementations of the steps described, for other types of devices, will be understood by one of skill in the art from the description herein. One or more of the steps shown and described may be performed simultaneously, in a series, in an order other than shown and described, or in conjunction with additional steps. Some steps may be omitted or, in some applications, repeated.

At block 1002, in this example implementation, one or more graphical elements 700 is presented on the display 180B of an eyewear device 100. The eyewear device 100 includes an image processing system 920 and a camera system 114 that includes one or more cameras 114A, 114B for capturing still images or frames of video data 900. In some implementations, the processor 432 on the eyewear 100 presents the elements 700 to the user on one or both displays 180A, 180B using the image processor 412 and the image display driver 442. In some implementations, an element control application 910 controls the step at block 1002 of presenting the graphical elements 700 on the display. In other implementations, a separate application (already in operation) is presenting the graphical elements 700 on the display.

As used herein, the one or more graphical elements 700 means and includes any collection of graphical elements presented on a display, including but not limited to virtual objects associated with VR experiences and graphical elements such as icons, thumbnails, taskbars, and menu items.

The eyewear device includes a semi-transparent image display 180B which, as described herein, may include a semi-transparent lens layer and a display matrix layer configured to present images on the lens of the eyewear device. The graphical elements 700 are presented as an overlay relative the physical environment 600. The effect, as shown, allows the viewer to view and interact with the graphical elements 700 while the surrounding environment 600 also remains visible through the display 180B.

Figure 7:
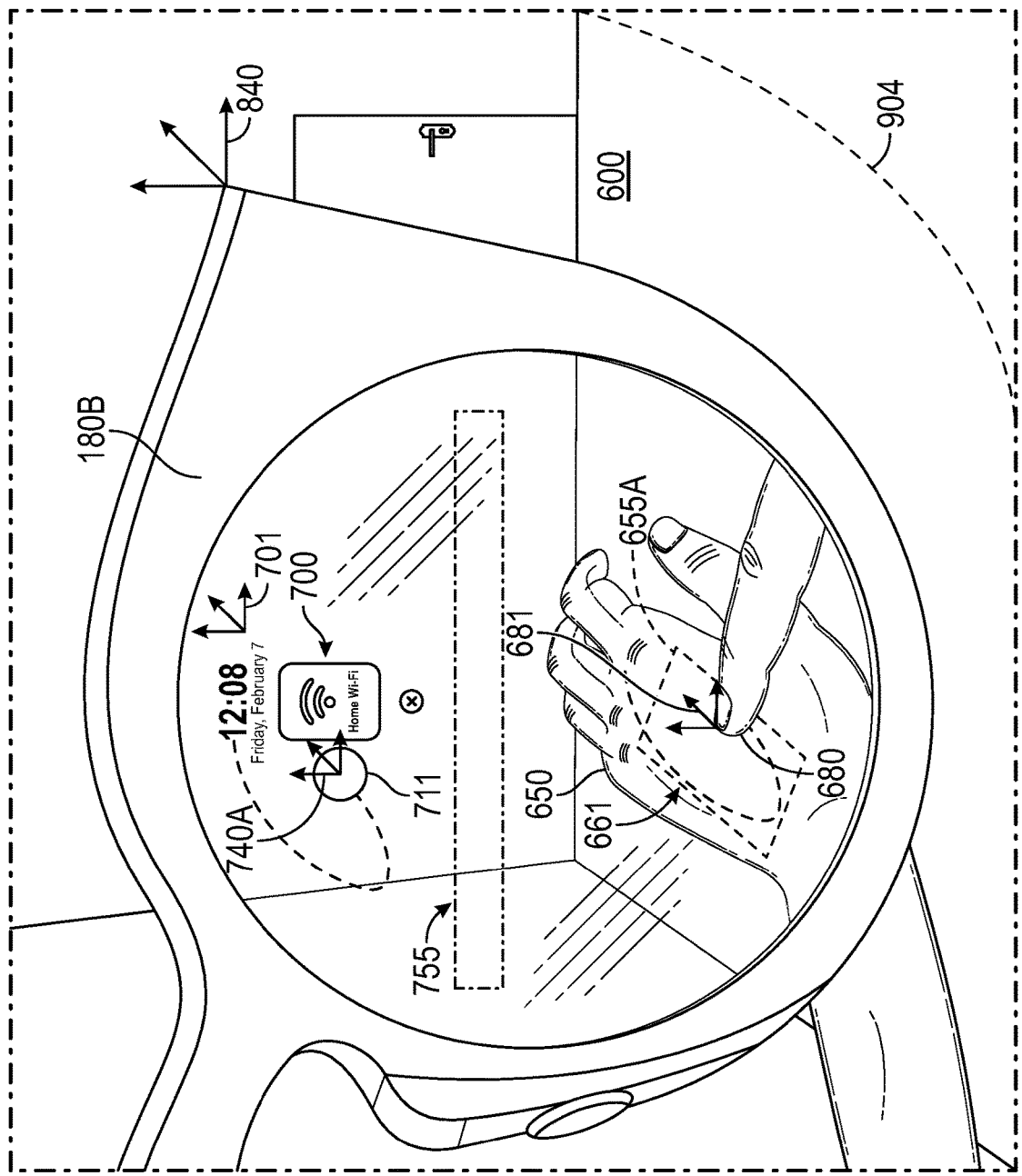
FIG. 7 is a perspective illustration of an example bimanual hand gesture for controlling a movable element on a display.

FIG. 7 is a perspective illustration of an example bimanual hand gesture for controlling the apparent movement of a movable element, such as a cursor 711, on a display. In this example, the graphical elements 700 include a time, date, a graphical icon, a selectable button, and the cursor 711. The one or more graphical elements 700 are presented as an overlay relative to the physical environment and appear at a first position 701 relative to a display plane 755 associated with the display 180B, as shown. The three-dimensional coordinates of the first position 701 are defined relative to the display plane 755. The display plane 755 may be defined by one or more discrete points or positions along or near the lens of the display 180B. For example, the display plane 755 may be defined by a rectangular shape, as shown, which lies along a plane that is generally parallel to the display 180B. The first position 701 of the graphical elements 700, as shown, may be located near or immediately adjacent any element. The example bimanual hand gesture, as shown, includes a first hand 650 and a fingertip 680 associated with a second hand 652. In some implementations, the first hand 650 is the non-dominant hand, allowing the user to maneuver the fingertip 680 of the dominant hand.

Block 1004 in FIG. 10 describes an example step of capturing frames a video data 900 with the camera system 114. In some implementations, the high-speed processor 432 of the eyewear device 100 stores the captured frames of video data 900 with a camera system 114 as the wearer moves through a physical environment 600. As described above, the camera system 114 typically has a camera field of view 904 that captures images and video beyond the limits of the display 180B.

The camera system 114, in some implementations, includes one or more high-resolution, digital cameras equipped with a CMOS image sensor capable of capturing high-definition still images and high-definition video at relatively high frame rates (e.g., thirty frames per second or more). Each frame of digital video includes depth information for a plurality of pixels in the image. In this aspect, the camera system 114 serves as a high-definition scanner by capturing a detailed input image of the physical environment. The camera system 114, in some implementations, includes a pair of high-resolution digital cameras 114A, 114B coupled to the eyewear device 100 and spaced apart to acquire a left-camera raw image and a right-camera raw image, as described herein. When combined, the raw images form an input image that includes a matrix of three-dimensional pixel locations. The example method, at block 1304, in some implementations, includes storing the captured frames of video data 900 in memory 434 on the eyewear device 100, at least temporarily, such that the frames are available for analysis.

Block 1006 describes an example step of detecting a first hand 650 in the captured frames of video data 900 with the image processing system 920. In some example implementations, an image processing system 920 analyzes the pixel-level data in the captured frames of video data 900 to determine if the frame includes a human hand.

Block 1008 describes an example step of defining a first input plane 655 associated with a surface 660 of the detected first hand 650. The defined first input plane 655 is persistently associated with the hand surface 660, such that the first input plane 655 moves as the hand surface 660 moves, over time, as detected in the captured frames of video data 900. The first input plane 655, in some implementations, is defined relative to the display plane 755 (instead of being defined relative to the physical environment 600, for example, relative to one or more landmarks on the hand). Any of a variety of suitable hand surfaces 600 may be identified for use in defining the first input plane 655. The hand surface 660 operates as a simulated or virtual input component (e.g., a virtual touch screen or touchpad). Compared to virtual elements displayed in mid-air or onto a surface like a tabletop, the use of a hand surface 660 provides tactile, haptic feedback to the user. In addition to feeling the input actions against the hand surface 660, the user's accuracy will be further improved due to proprioception (i.e., awareness of the location and movement of body parts, including of course the hands and fingers). Tactile feedback and proprioception will facilitate the learning, ease of use, endurance, and efficacy of various bimanual gestures performed by both hands. For example, the pressing gesture described herein includes the fingertip 680 making a small indentation into the flesh of the hand surface 660. The tapping gestures includes striking the hand surface 660 with the fingertip 680. These tactile sensations are familiar, easy to learn and execute, and less prone to fatigue, compared to mid-air or surface-bound gestures. Moreover, the use of both hands, in front of the body, allows the user to brace the weight of the arms and hands against the torso or while resting on another surface such as a tabletop.

For example, the dorsal surface 661 of the detected first hand 650 is shown in FIG. 7. All or part of the dorsal surface 661 may be used to define a first input plane 655A, as shown. The first input plane 655A may by defined according to multiple points or sides of a polygon (e.g., the rectangular shape, as shown) and may span any portion of the dorsal surface 611. In this example, the first input plane 655A simulates a trackpad on the back of the hand. Motion of the fingertip 680 relative to the first input plane 655A is tracked in real time and correlated to drive the apparent motion of the cursor 711 relative to the display plane 755, as described herein.

Figure 8:
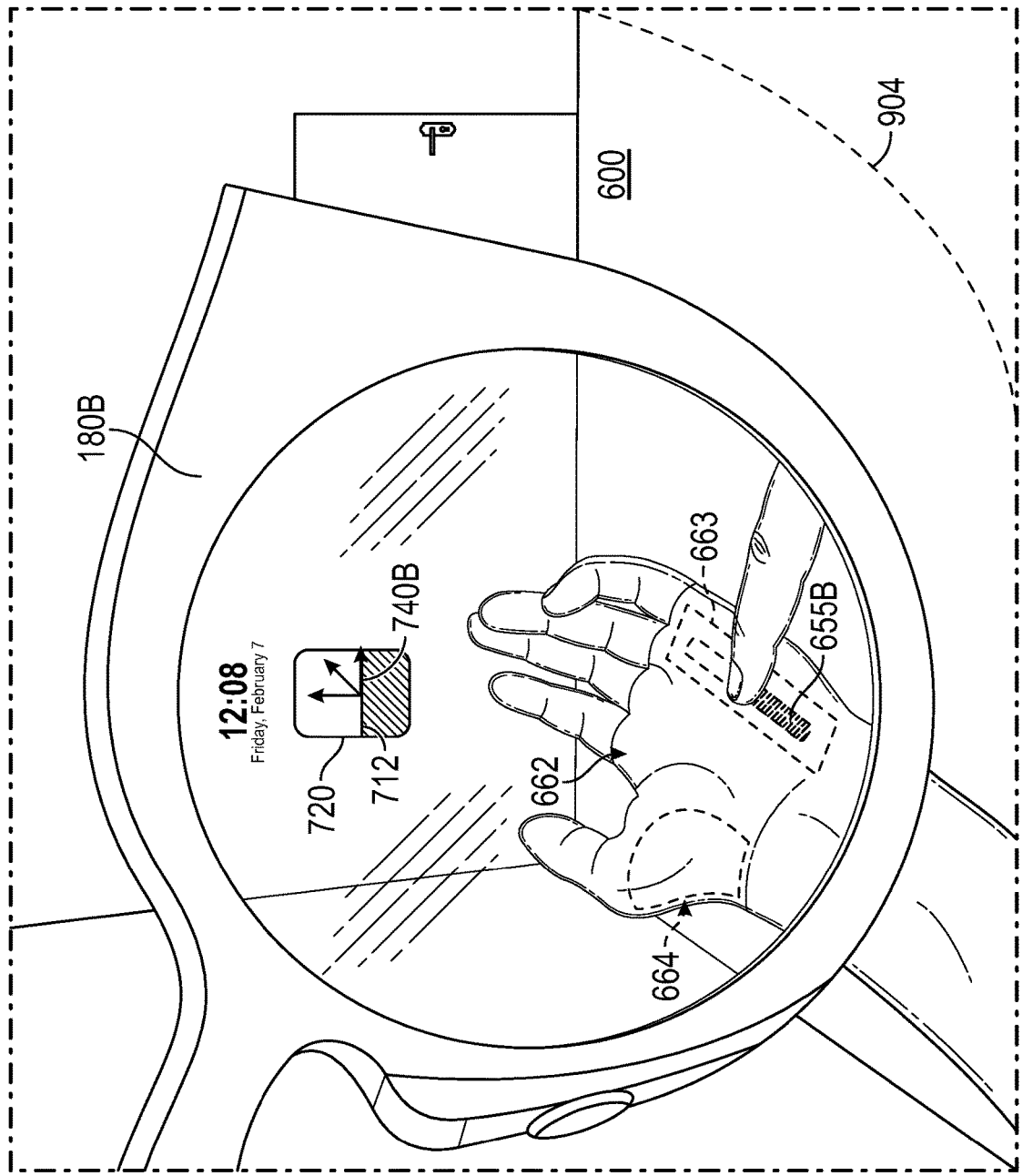
FIG. 8 is a perspective illustration of another example bimanual hand gesture for controlling an interactive graphical element on a display.
Figure 9:
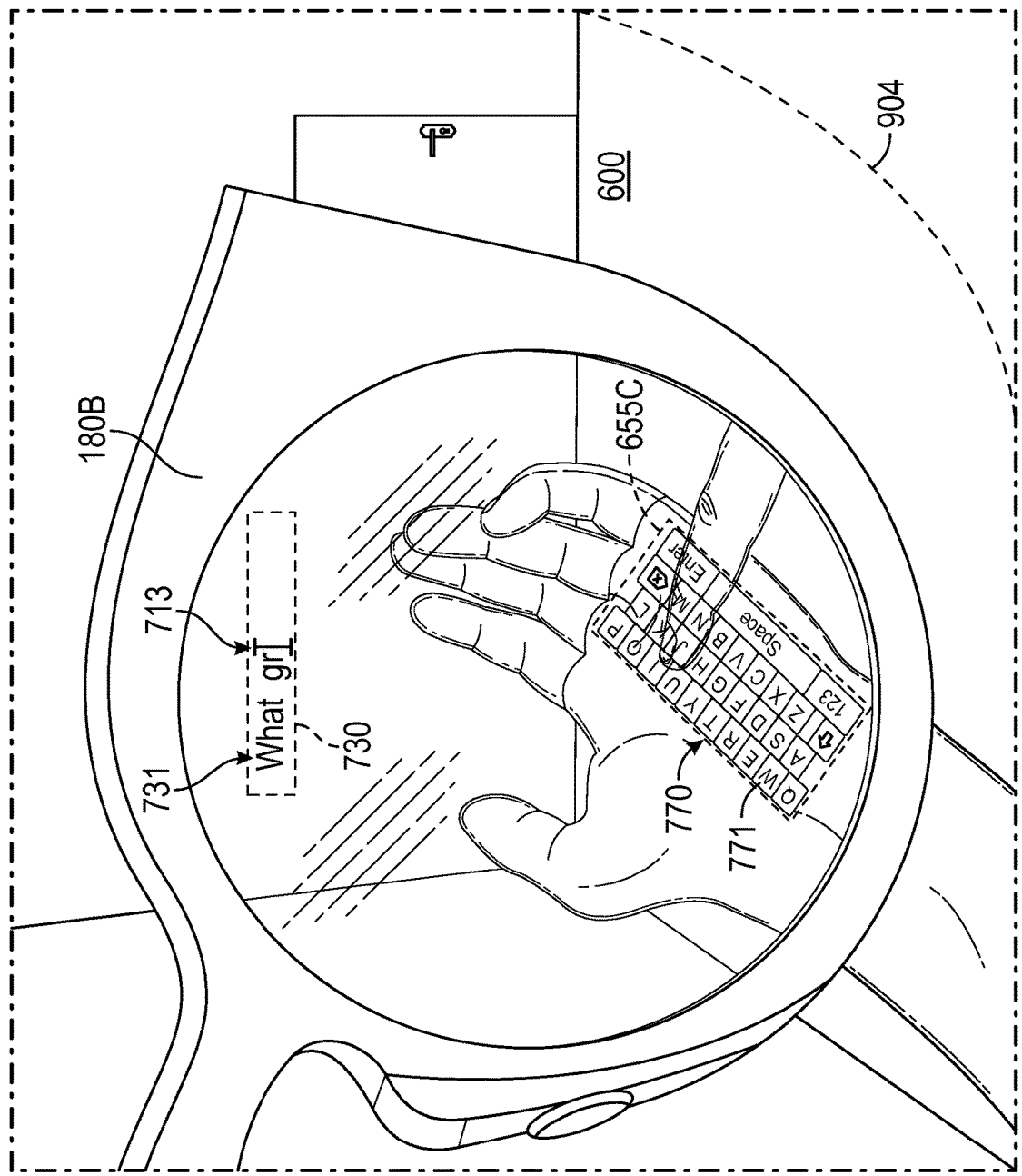
FIG. 9 is a perspective illustration of another example bimanual hand gesture for selecting items on a mapped region for presentation on a display.

In another example, the palmar surface 662 of the detected first hand 650 is illustrated in FIG. 8. Any portion of the palmar surface 662 may be used. For example, as shown, the hypothenar eminence 663 is used to define a first input plane 655B that simulates a slider. The hypothenar eminence 663 extends along the outer edge of the palmar surface 662, extending from about the distal wrist crease to about the proximal digital crease (i.e., the start of the fingers) and is bounded laterally near the thenar crease, near the center of the palm. The input plane 655C in FIG. 9 is also associated with the hypothenar eminence 663. In another example, the thenar eminence 664 may be used. The thenar eminence 664 near the thumb extends from about the distal wrist crease to the web space between the thumb and index finger and is bounded laterally near the thenar crease.

Generally, the broader palmar surface 662 is relatively more sensitive (e.g., ticklish) and more concave in shape compared to the hypothenar eminence 663 and the thenar eminence 664. Hyper-sensitivity of the palm, as well as the generally concave shape of the center of the palm, can increase the error rate and decrease the efficacy of the bimanual gesture in producing the desired result. Similarly, the dorsal surface 661 is less sensitive and more convex in shape, compared to the center of the palmar surface 662.

As shown in FIG. 8, the hypothenar eminence 663 is used to define a first input plane 655B that simulates a slider along the edge of the hand. The first input plane 655B may by defined according to multiple points or sides of a polygon, such as the rectangular shape that coincides with the simulated slider on the hand, as shown. Motion of the fingertip relative to the first input plane 655B is tracked in real time and correlated to drive the apparent motion of a slider 712 in a viewport 720, relative to the display plane 755, as described herein.

The process of defining a first input plane 655 at block 1008, in some implementations, is accomplished by the image processing system 920. After the first hand 650 is detected at block 1006, the image processing system 920 determines whether the detected first hand 650 matches a start shape selected from a plurality of predefined starting hand shapes, as stored in a library of hand gestures 480. The predefined starting hand shapes, as described, include shapes that expose the dorsal surface 661 or the palmar surface 662, or any other suitable surface of a hand. In a related aspect, the process of exposing the dorsal surface 661 or palmar surface 662 may include motion of the hand over time. Accordingly, the predefined starting hand shapes may include gestural movements, such as pronating the hand to expose the dorsal surface 661 or supinating the hand to expose the palmar surface 662. In this aspect, the process at block 1008, in some implementations, includes comparing the detected first hand 650 captured in the video data 900, over a period of time, sometimes on a pixel-by-pixel level, to the plurality of predefined starting hand shapes that are stored in the hand gesture library 480 until a match is identified. As used herein, the term match is meant to include substantial matches or near matches, which may be governed by a predetermined confidence value associated with possible or candidate matches. The detected hand shape data may include three-dimensional coordinates for the wrist, up to fifteen interphalangeal joints, up five fingertips, and other skeletal or soft-tissue landmarks found in a captured frame. In some examples, the detecting process includes calculating the sum of the geodesic distances between the detected hand shape fingertip coordinates and a set of fingertip coordinates for each hand gesture stored in the library 480. A sum that falls within a configurable threshold accuracy value represents a match.

Block 1010 in FIG. 10 describes an example step of determining, with the localization system 915, a current eyewear location 840 relative to the defined first input plane 655. The localization system 915, in some implementations, configures the processor 432 on the eyewear 100 to obtain localization data for use in determining the current eyewear location 840 relative to the defined first input plane 655. The localization data may be derived from the captured frames of video data 900, an IMU unit 472, a GPS unit 473, or a combination thereof. The localization system 915 may construct a virtual map of various elements within the camera field of view 904 using a SLAM algorithm, as described herein, updating the map and the location of objects at least as frequently as the frame rate of the camera system 114 (e.g., calculating and updating the mapping and localization of the current eyewear location 840 as frequently as thirty times per second, or more).

Block 1012 describes an example step of calculating a correlation 950 between the defined first input plane 655 (associated with the hand 650) and the display plane 755, in accordance with the current eyewear location 840 (as determined in block 1010). The term correlation 950 refers to and includes one or more vectors, matrices, formulas, or other mathematical expressions sufficient to define the three-dimensional distance between the defined first input plane 655 and the display plane 755, in accordance with the current eyewear location 840. The current eyewear location 840, of course, is tied to or persistently associated with the display plane 755 that lies along the display 180B supported by the frame of the eyewear device 100. In this aspect, the correlation 950 performs the function of calibrating the motion of the eyewear 100 (and the display plane 755) with the motion of the hand 650 (along the defined input plane 655). The correlation 950 mathematically translates locations along the input plane 655 to corresponding positions on the display plane 755. Moreover, because the localization process at block 1010 occurs continually and frequently, the correlation 950 is calculated continually and frequently, resulting in accurate and near real-time tracking of the hand 650 relative to the eyewear 100.

Block 1014 describes an example step of detecting a series of bimanual hand shapes 670 in the captured frames of video data 900 with the image processing system 920. The series of bimanual hand shapes 670 in some implementations includes a series of current fingertip locations 681 (i.e., the fingertip 680 of the second hand 652) relative to the defined first input plane 655 (on the first hand 650). In other words, in this example, a bimanual hand shape is defined by the motion of the second hand 652 relative to the first hand 650. The image processing system 920 analyzes the pixel-level data in the captured frames of video data 900 to detect the series of current fingertip locations 681 relative to the defined first input plane 655 on the first hand 650.

In response to detecting a series of bimanual hand shapes 670 at block 1014, the example process at block 1016 includes presenting a first movable element 710 at a current first element position 740 on the display, in accordance with both the detected series of current fingertip locations 681 and the calculated correlation 950. In other words, when a series of bimanual hand shapes 670 is detected, the system presents a first movable element 710 on the display. The first movable element 710 may include any of a variety of interactive elements, such as a cursor 711 (shown in FIG. 7), a slider 712 (shown in FIG. 8) in a viewport 720, or a caret 713 (shown in FIG. 9) in a text box 730.

The first movable element 710 is presented on the display at a current first element position 740, in accordance with both the detected series of current fingertip locations 681 and the calculated correlation 950. For example, as shown in FIG. 7, the cursor 711 is presented at a current first element position 740A in accordance with both (a) the current fingertip location 681 (relative to the defined first input plane 655A), and (b) the correlation 950 between the input surface 655A and the display plane 755. In another example, as shown in FIG. 8, the slider 712 is presented at a current first element position 740B in accordance with both (a) the current fingertip location relative to the defined first input plane 655B, and (b) the correlation 950 between the input surface 655B and the display plane 755. In this aspect, the apparent motion of the first movable element 710 is correlated with the detected actual motion of the fingertip 680.

The detecting process at block 1014 constitutes a continual and frequent tracking of the current fingertip location 681 relative to the defined first input plane 655 (on the first hand 650). The process, in some implementations, includes detecting the current fingertip location 681 in three-dimensional coordinates relative to the input plane 655, including a depth dimension that is oriented orthogonally to the defined first input plane 655. In some implementations, the tracking and display process is suspended temporarily if the detected depth of the fingertip location 681 exceeds a predefined depth threshold relative to the input plane 655. In response to detecting an excess depth, the first movable element is presented on the display at the most recent current first element position until, at a later time, the depth is not in excess of the depth threshold. When the current fingertip location 681 is again detected within the predefined depth threshold, the process of tracking and display continues; in some implementations, starting from the most recent previous location, while in others, starting from an entirely new location.

In addition to moving the fingertip 680 in a sliding motion relative to the defined first input plane 655, the fingertip 680 may also perform a selecting gesture (e.g., pressing the fingertip 680 into the surface 660 of the first hand 650, or tapping the fingertip 680 against the surface 660). Accordingly, the example process at block 1018 includes determining whether the detected series of bimanual hand shapes 670 matches a predefined hand gesture selected from a plurality of predefined hand gestures 850 stored in the hand gesture library 840. In this aspect, image processing system 920 analyzes the pixel-level data in the captured frames of video data 900 to determine whether the fingertip 680 is performing a selecting gesture (e.g., pressing, tapping) relative to the defined first input plane 655 on the first hand 650.

In this example, the predefined hand gestures 650 include a pressing gesture, a tapping gesture, and one or more other selecting gestures. The data stored in the captured frames of video data 900 is compared to the predefined hand gestures 650 stored in the library of hand gestures 480.

The hand gesture library 480 includes a large number of poses and gestures, including descriptions of a hand in various positions and orientations. The stored poses and gestures are suitable for ready comparison to a hand shape that is detected in an image. A hand gesture record stored in the library 480 in some implementations includes three-dimensional coordinates for a number of landmarks on the hand, including the wrist, the fifteen interphalangeal joints, and the five fingertips, as well as other skeletal and soft-tissue landmarks. A hand gesture record stored in the library 480 may also include text identifiers, point of view annotations, directional references (e.g., palmar, dorsal, lateral), rotational references (e.g., stable, flexing, extending, pronating, supinating), and other data and descriptors related to each predefined hand gesture 850. Each hand gesture record stored in the library 480 may include a set of exemplary three-dimensional coordinates for each joint and the tip, a hand position identifier (e.g., neutral hand), and a finger position identifier (e.g., index flexed partial). For a hand gesture (e.g., a series of hand poses observed over time), a hand gesture record stored in the library 480 may include a set of exemplary three-dimensional coordinates for each joint and the tip at each location of the index finger, over a particular time interval (e.g., two seconds or longer), a hand motion identifier (e.g., neutral hand stable), and a finger motion identifier (e.g., index flexing and extending continually).

The predefined hand gestures 850 in some implementations, include a pressing gesture, a tapping gesture, and one or more other selecting gestures. Any of a variety of other predefined hand gestures 850 may be established and stored in the hand gesture library 480.

For the pressing gesture, the record stored in the hand gesture library 480, in some implementations, includes a gesture identifier (e.g., "pressing"), a first motion identifier (e.g., moving the fingertip downward from an initial depth to within a predefined threshold pressing depth), a minimum pressing duration (e.g., one second), and a subsequent motion identifier (e.g., lifting the fingertip upward to at least the initial depth)—along with a series of exemplary three-dimensional coordinates for each hand and finger landmark during the time interval (e.g., twenty coordinate sets, every five milliseconds).

For the tapping gesture, the record stored in the hand gesture library 480, in some implementations, includes a gesture identifier (e.g., "tapping"), a first motion identifier (e.g., lifting the fingertip upward from an initial depth to with a predefined threshold lifted depth), a minimum lift duration (e.g., one-half second), an interim motion identifier (e.g., moving the fingertip downward to at least the initial depth or to within a predefined threshold tapping depth), and a subsequent motion identifier (e.g., lifting the fingertip upward again to within a predefined return depth or at least the predefined threshold lifted depth)—along with a series of exemplary three-dimensional coordinates for each hand and finger landmark during the time interval (e.g., twenty coordinate sets, every five milliseconds).

Other selecting gestures, in some implementations, include hovering the fingertip for a predefined or configurable time duration. Moreover, although the gestures are described herein with reference to a single finger of the second hand, one or more fingers may be used to execute a selected hand gesture.

Referring again to FIG. 10, the example process at block 1020 includes executing a selecting action 800 in accordance with both the matching predefined hand gesture (e.g., pressing, tapping) and the current first movable element position 740. The selecting action 800 is correlated with the most recent movable element position 740 on the display in order to execute a selection of the graphical element 700 that is nearest to the current position 740 of the movable element 710. In this context, the terms near or nearest is meant to include positions that coincide or nearly coincide, which may be governed by a configurable, predefined confidence value associated with possible or candidate elements 710. In some implementations, the correlation process includes calculating the sum of the geodesic distances between the current first movable element position 740 and a candidate graphical element. A sum that falls within the configurable, predefined confidence value represents the nearest element.

Referring to FIG. 7, the cursor 711 is presented at a current first element position 740A on the display. The series of bimanual hand shapes 670 matches the pressing gesture. The selecting action 800, in one example, may be executed when the cursor 711 is presented at a first element position that nearly coincides with the display of the selectable button (e.g., the circled X) and, in response, the button is selected, resulting in one or more subsequent actions associated with the button. Accordingly, by performing a series of bimanual hand shapes 670 that matches the pressing gesture (e.g., pressing the fingertip 680 into the surface of the first hand 650), the cursor 711 selects the graphical element 700 that is near the current element position 740A.

In another example implementation, referring to FIG. 8, the slider 712 is presented at a current first element position 740B. The series of bimanual hand shapes 670 matches the tapping gesture. In response to the selecting action 800, in some implementations, the slider 712 is releasably set or fixed relative to the viewport 720. Accordingly, by performing a series of bimanual hand shapes 670 that matches the tapping gesture (e.g., tapping the fingertip 680 against the surface of the first hand 650), the slider 712 is releasably set inside the viewport 720 in accordance with the current element position 740B.

In another example implementation, referring to FIG. 9, a text cursor or caret 713 is presented at a current first element position on the display. In this example, the caret 713 is a movable element 710, at least within the text box 730. The text box 730 may or may not include a visible border or frame. The series of bimanual hand shapes 670 matches the tapping gesture. In response to the selecting action 800, the caret 713 is releasably set or fixed relative to the text box 713 in accordance with the current element position. The display and usage of a caret 713 in this context may be a configurable and optional feature.

FIG. 9 is a perspective illustration of an example bimanual hand gesture for selecting one or more items or keys, such as keyboard keys, which are projected or otherwise presented onto a portion of the palmar surface 622 of the first hand. In this example, the eyewear device 100 is coupled to an auxiliary projector (not shown) which is separate and distinct from the laser projector 150 described herein. The laser projector 150, as described herein, is coupled to one of the temples (e.g., right temple 125B) of the eyewear device 100 and configured to project elements onto one of the displays (e.g., right display 180B).

In this example, the process at block 1020 of executing a selecting action 800 includes establishing a map relative to the defined first input plane 655C, in which the map includes the location of a plurality of keys 770, such as the keyboard keys shown in FIG. 9. The size and shape of the keys 770, in some implementations, may be adjusted in size and shape to better fit a particular hand surface 660 (e.g., palmar or dorsal). Each key is associated with an icon, such as an alphanumeric character. The selecting action 800 further includes selecting a first key 771 in accordance with the current fingertip location 681 relative to the map of keys 770; and then presenting on the display a first icon 731 associated with the selected first key 771. In this example process, the caret 713 may be configured to advance to a subsequent space inside the text box 730, in preparation for a subsequent selecting action 800 of a subsequent key and its corresponding icon.

In another example implementation, the process at block 1018 of determining whether a detected series of bimanual hand shapes 670 matches a predefined hand gesture 850 involves using a machine-learning algorithm to compare the pixel-level data about the hand shape in one or more captured frames of video data to a collection of images that include hand gestures.

Machine learning refers to an algorithm that improves incrementally through experience. By processing a large number of different input datasets, a machine-learning algorithm can develop improved generalizations about particular datasets, and then use those generalizations to produce an accurate output or solution when processing a new dataset. Broadly speaking, a machine-learning algorithm includes one or more parameters that will adjust or change in response to new experiences, thereby improving the algorithm incrementally; a process similar to learning.

In the context of computer vision, mathematical models attempt to emulate the tasks accomplished by the human visual system, with the goal of using computers to extract information from an image and achieve an accurate understanding of the contents of the image. Computer vision algorithms have been developed for a variety of fields, including artificial intelligence and autonomous navigation, to extract and analyze data in digital images and video.

Deep learning refers to a class of machine-learning methods that are based on or modeled after artificial neural networks. An artificial neural network is a computing system made up of a number of simple, highly interconnected processing elements (nodes), which process information by their dynamic state response to external inputs. A large artificial neural network might have hundreds or thousands of nodes.

A convolutional neural network (CNN) is a type of neural network that is frequently applied to analyzing visual images, including digital photographs and video. The connectivity pattern between nodes in a CNN is typically modeled after the organization of the human visual cortex, which includes individual neurons arranged to respond to overlapping regions in a visual field. A neural network that is suitable for use in the determining process described herein is based on one of the following architectures: VGG16, VGG19, ResNet50, Inception V3, Xception, or other CNN-compatible architectures.

In the machine-learning example, at block 1018, the processor 432 determines whether a detected series of bimanual hand shapes substantially matches a predefined hand gesture using a machine-trained algorithm referred to as a hand feature model. The processor 432 is configured to access the hand feature model, trained through machine learning, and applies the hand feature model to identify and locate features of the hand shape in one or more frames of the video data.

In one example implementation, the trained hand feature model receives a frame of video data which contains a detected hand shape and abstracts the image in the frame into layers for analysis. Data in each layer is compared to hand gesture data stored in the hand gesture library 480, layer by layer, based on the trained hand feature model, until a good match is identified.

In one example, the layer-by-layer image analysis is executed using a convolutional neural network. In a first convolution layer, the CNN identifies learned features (e.g., hand landmarks, sets of joint coordinates, and the like). In a second convolution layer, the image is transformed into a plurality of images, in which the learned features are each accentuated in a respective sub-image. In a pooling layer, the sizes and resolution of the images and sub-images are reduced in order isolation portions of each image that include a possible feature of interest (e.g., a possible palm shape, a possible finger joint). The values and comparisons of images from the non-output layers are used to classify the image in the frame. Classification, as used herein, refers to the process of using a trained model to classify an image according to the detected hand shape. For example, an image may be classified as a "pressing action" if the detected series of bimanual hand shapes matches the pressing gesture stored in the library 480.

Any of the functionality described herein for the eyewear device 100, the mobile device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating system. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of controlling a graphical element in response to bimanual gestures detected with an eyewear device, the eyewear device comprising a camera system, an image processing system, a localization system, and a display, the method comprising:
   presenting on the display one or more graphical elements at a first position relative to a display plane;
   capturing frames of video data with the camera system;
   detecting a first hand in the captured frames of video data with the image processing system;
   defining, with the image processing system, a first input plane associated with a surface of the detected first hand, wherein the first input plane is defined relative to the display plane;
   determining, with the localization system, a current eyewear location relative to the defined first input plane;
   calculating a correlation between the defined first input plane and the display plane, in accordance with the current eyewear location;
   detecting, with the image processing system, a series of bimanual hand shapes comprising a series of current fingertip locations associated with a fingertip of a second hand, relative to the defined first input plane;
   presenting on the display a first movable element at a current first element position, in accordance with both a current fingertip location and the calculated correlation;
   determining, with the image processing system, whether the detected series of bimanual hand shapes matches a predefined hand gesture selected from a plurality of predefined hand gestures; and
   executing a selecting action in accordance with both the matching predefined hand gesture and the current first element position.

2. The method of claim 1, further comprising:
   detecting a subsequent series of bimanual hand shapes;
   presenting on the display a subsequent movable element in accordance with the detected subsequent series of bimanual hand shapes and the calculated correlation;
   determining whether the detected subsequent series of bimanual hand shapes matches a subsequent predefined hand gesture selected from the plurality of predefined hand gestures; and
   executing a subsequent selecting action in accordance with the matching subsequent predefined hand gesture and the current first element position.

3. The method of claim 1, wherein the surface of the detected first hand is a region selected from the group consisting of at least a portion of: a dorsal surface, a palmar surface, a hypothenar eminence, and a thenar eminence.

4. The method of claim 1, wherein the first movable element comprises a cursor presented on the display at the current first element position, and
   wherein the step of executing a selecting action comprises selecting a first selectable graphical element nearest the current first element position.

5. The method of claim 1, wherein the first movable element comprises a slider presented on the display at the current first element position, and
   wherein the step of executing a selecting action comprises releasably setting the slider near the current first element position.

6. The method of claim 1, wherein the step of executing a selecting action further comprises:
    establishing, relative to the defined first input plane, a map comprising a plurality of keys;
    selecting a first key in accordance with the current fingertip location relative to the map; and
    presenting on the display a first icon associated with the selected first key.

7. The method of claim 1, wherein the plurality of predefined hand gestures comprises a gesture selected from the group consisting of:
    a pressing gesture characterized by the identified current fingertip location moving, relative to the defined first input plane, downward from an initial depth to within a predefined pressing depth for at least a minimum pressing duration, and then upward to at least the initial depth; and
    a tapping gesture characterized by the identified current fingertip location moving, relative to the defined first input plane, upward from an initial depth to within a predefined lifted depth, downward to at least the initial depth, and then upward to within a predefined return depth.

8. The method of claim 1, wherein the step of presenting on the display a first movable element at a current first element position, in accordance with a current fingertip location further comprises:
    defining the current fingertip location to include a depth orthogonal to the defined first input plane;
    determining whether the depth exceeds a predefined depth threshold above or below the defined first input plane;
    in response to determining that the depth exceeds the predefined depth threshold, persistently presenting the first movable element at a recent current first element position.

9. A bimanual control system, comprising:
    an eyewear device comprising a processor, a memory, a camera system, an image processing system, a localization system, and a display;
    programming in the memory, wherein execution of the programming by the processor configures the eyewear device to perform functions, including functions to:
    present on the display one or more graphical elements at a first position relative to a display plane;
    capture frames of video data with the camera system;
    detect a first hand in the captured frames of video data with the image processing system;
    define, with the image processing system, a first input plane associated with a surface of the detected first hand, wherein the first input plane is defined relative to the display plane;
    determine, with the localization system, a current eyewear location relative to the defined first input plane;
    calculate a correlation between the defined first input plane and the display plane, in accordance with the current eyewear location;
    detect, with the image processing system, a series of bimanual hand shapes comprising a series of current fingertip locations associated with a fingertip of a second hand, relative to the defined first input plane;
    present on the display a first movable element at a current first element position, in accordance with both a current fingertip location and the calculated correlation;
    determine, with the image processing system, whether the detected series of bimanual hand shapes matches a predefined hand gesture selected from a plurality of predefined hand gestures; and
    execute a selecting action in accordance with both the matching predefined hand gesture and the current first element position.

10. The bimanual control system of claim 9, wherein the execution of the programming further configures the eyewear device to:
    detect a subsequent series of bimanual hand shapes;
    present on the display a subsequent movable element in accordance with the detected subsequent series of bimanual hand shapes and the calculated correlation;
    determine whether the detected subsequent series of bimanual hand shapes matches a subsequent predefined hand gesture selected from the plurality of predefined hand gestures; and
    execute a subsequent selecting action in accordance with the matching subsequent predefined hand gesture and the current first element position.

11. The bimanual control system of claim 9, wherein the surface of the detected first hand is a region selected from the group consisting of at least a portion of: a dorsal surface, a palmar surface, a hypothenar eminence, and a thenar eminence.

12. The bimanual control system of claim 9, wherein the first movable element comprises a cursor presented on the display at the current first element position, and
    wherein the selecting action comprises selecting a first selectable graphical element nearest the current first element position.

13. The bimanual control system of claim 9, wherein the first movable element comprises a slider presented on the display at the current first element position, and
    wherein the selecting action comprises releasably setting the slider near the current first element position.

14. The bimanual control system of claim 9, wherein the function to execute a selecting action further comprises functions to:
    establish, relative to the defined first input plane, a map comprising a plurality of keys;
    select a first key in accordance with the current fingertip location relative to the map; and
    present on the display a first icon associated with the selected first key.

15. The bimanual control system of claim 9, wherein the plurality of predefined hand gestures comprises a gesture selected from the group consisting of:
    a pressing gesture characterized by the identified current fingertip location moving, relative to the defined first input plane, downward from an initial depth to within a predefined pressing depth for at least a minimum pressing duration, and then upward to at least the initial depth; and
    a tapping gesture characterized by the identified current fingertip location moving, relative to the defined first input plane, upward from an initial depth to within a predefined lifted depth, downward to at least the initial depth, and then upward to within a predefined return depth.

16. The bimanual control system of claim 9, wherein the function to present on the display a first movable element at a current first element position, in accordance with a current fingertip location further comprises functions to:
    define the current fingertip location to include a depth orthogonal to the defined first input plane;
    determine whether the depth exceeds a predefined depth threshold above or below the defined first input plane;

in response to determining that the depth exceeds the predefined depth threshold, persistently present the first movable element at a recent current first element position.

17. A non-transitory computer-readable medium storing program code which, when executed, is operative to cause an electronic processor to perform the steps of:
  presenting on a display one or more graphical elements at a first position relative to a display plane, wherein the display is coupled to an eyewear device comprising a processor, a memory, a camera system, a localization system, and an image processing system;
  capturing frames of video data with the camera system;
  detecting a first hand in the captured frames of video data with the image processing system;
  defining, with the image processing system, a first input plane associated with a surface of the detected first hand, wherein the first input plane is defined relative to the display plane;
  determining, with the localization system, a current eyewear location relative to the defined first input plane;
  calculating a correlation between the defined first input plane and the display plane, in accordance with the current eyewear location;
  detecting, with the image processing system, a series of bimanual hand shapes comprising a series of current fingertip locations associated with a fingertip of a second hand, relative to the defined first input plane;
  presenting on the display a first movable element at a current first element position, in accordance with both a current fingertip location and the calculated correlation;
  determining, with the image processing system, whether the detected series of bimanual hand shapes matches a predefined hand gesture selected from a plurality of predefined hand gestures; and
  executing a selecting action in accordance with both the matching predefined hand gesture and the current first element position.

18. The non-transitory computer-readable medium storing program code of claim 17, wherein the first movable element comprises a cursor presented on the display at the current first element position, and
  wherein the step of executing a selecting action comprises selecting a first selectable graphical element nearest the current first element position.

19. The non-transitory computer-readable medium storing program code of claim 17, wherein the first movable element comprises a slider presented on the display at the current first element position, and
  wherein the step of executing a selecting action comprises releasably setting the slider near the current first element position.

20. The non-transitory computer-readable medium storing program code of claim 17, wherein the step of executing a selecting action further comprises:
  establishing, relative to the defined first input plane, a map comprising a plurality of keys;
  selecting a first key in accordance with the current fingertip location relative to the map; and
  presenting on the display a first icon associated with the selected first key.

* * * * *